US012460139B2

(12) United States Patent
Spry et al.

(10) Patent No.: US 12,460,139 B2
(45) Date of Patent: Nov. 4, 2025

(54) SOLVENT EXTRACTION SYSTEM AND PROCESS FOR HYDROTHERMAL LIQUEFACTION

(71) Applicant: Battelle Memorial Institute, Richland, WA (US)

(72) Inventors: David B. Spry, Prairieville, LA (US); Emily N. Diaz, Kennewick, WA (US); Uriah J. Kilgore, Kennewick, WA (US); Michael R. Thorson, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 156 days.

(21) Appl. No.: 18/454,695

(22) Filed: Aug. 23, 2023

(65) Prior Publication Data
US 2025/0066678 A1    Feb. 27, 2025

(51) Int. Cl.
*C10G 21/28* (2006.01)
*C10G 33/04* (2006.01)

(52) U.S. Cl.
CPC ............ *C10G 21/28* (2013.01); *C10G 33/04* (2013.01); *C10G 2300/1011* (2013.01); *C10G 2300/4006* (2013.01); *C10G 2300/4081* (2013.01); *C10G 2300/44* (2013.01)

(58) Field of Classification Search
CPC ............ C10G 21/28; C10G 2300/1011; C10G 2300/4006; C10G 2300/4081; C10G 2300/44; C10G 33/04
See application file for complete search history.

(56) References Cited

U.S. PATENT DOCUMENTS

| 9,904,063 B2 | 2/2018 | Flynn et al. |
| 2007/0012232 A1 | 1/2007 | Skrypski-Mantele et al. |
| 2012/0167452 A1 | 7/2012 | Platon et al. |

(Continued)

OTHER PUBLICATIONS

International Search Report and Written Opinion of the International Searching Authority, mailed Dec. 12, 2024, for corresponding International Application No. PCT/US2024/041526, 20 pages.

(Continued)

*Primary Examiner* — Ellen M McAvoy
*Assistant Examiner* — Chantel Graham
(74) *Attorney, Agent, or Firm* — Klarquist Sparkman, LLP

(57) ABSTRACT

A method can include: in a heat exchanger, cooling a biocrude oil emulsion stream received from a biocrude oil emulsion source, wherein the emulsion can include a biocrude oil phase, an aqueous phase, and solids; in a first mixing vessel, mixing the emulsion with a solvent to dissolve the biocrude oil phase and form a biocrude-solvent solution; in a first separator assembly, separating the biocrude-solvent solution from the aqueous phase and the solids; in a solvent recovery apparatus, recovering solvent from the biocrude-solvent solution; in a second mixing vessel, mixing the solvent with the aqueous phase and the solids received from the first separator assembly to dissolve biocrude oil remaining in the aqueous phase and the solids; and supplying the solvent and biocrude oil to the first mixing vessel as the solvent. In some examples, such a method can more effectively separate biocrude oil from the emulsion than conventional techniques.

20 Claims, 8 Drawing Sheets

(56) References Cited

U.S. PATENT DOCUMENTS

2014/0221630 A1 8/2014 Olivier et al.
2014/0311201 A1* 10/2014 Bathurst ................ D21C 3/20
                                                                 71/33

OTHER PUBLICATIONS

C.S. Robinson, "Some Factors Influencing Sedimentation," Industrial and Engineering Chemistry, vol. 18(8), pp. 869-871, Aug. 1, 1926.
N. Akiya et al., "Roles of Water for Chemical Reactions in High-Temperature Water," Chemical Reviews vol. 102, pp. 2725-2750, Jun. 21, 2002.
M.H. Huang et al., "Chemical composition of organic matters in domestic wastewater," Desalination, vol. 262, pp. 36-42, Jun. 26, 2010.
M. Möller et al., "Subcritical Water as Reaction Environment: Fundamentals of Hydrothermal Biomass Transformation," ChemSusChem vol. 4, pp. 566-579, Feb. 14, 2011.
S.S. Toor et al., "Hydrothermal liquefaction of biomass: A review of subcritical water technologies," Energy, vol. 36, pp. 2328-2342, Mar. 31, 2011.
P.J. Valdez et al., "Characterization of Product Fractions from Hydrothermal Liquefaction of *Nannochloropsis* sp. and the Influence of Solvents," Energy & Fuels, vol. 25, pp. 3235-3243, May 19, 2011.
"Chapter 16—Gravity Separation," *Mineral Processing Design and Operations*, 2$^{nc}$ ed., edited by A. Gupta and D. Yan, Elsevier: Amsterdam, May 13, 2016, pp. 563-628.
X. Yang et al., "Selective Extraction of Bio-oil from Hydrothermal Liquefaction of *Salix psammophila* by Organic Solvents with Different Polarities through Multistep Extraction Separation," BioResources, vol. 9(3), pp. 5219-5233, 2014.
S. Jones et al., "Process Design and Economics for the Conversion of Algal Biomass to Hydrocarbons: Whole Algae Hydrothermal Liquefaction and Upgrading," PNNL-23227, Mar. 2014.
W. Chen et al., "Co-liquefaction of swine manure and mixed-culture algal biomass from a wastewater treatment system to produce bio-crude oil," Applied Energy, 128, pp. 209-216, May 15, 2014.
J.G. Speight, "Feedstock Composition," *Handbook of Petroleum Refining*, CRC Press, Oct. 4, 2016, pp. 101-142.
C. Gai et al., "Characterization of aqueous phase from the hydrothermal liquefaction of *Chlorella pyrenoidosa*," Biosource Technology, vol. 184, pp. 328-335, Nov. 6, 2014.
T.H. Pedersen et al., "Continuous hydrothermal co-liquefaction of aspen wood and glycerol with water phase recirculation," Applied Energy, vol. 162, pp. 1034-1041, Jan. 15, 2016.
W.H. Yan et al., "Composition of the bio-oil from the hydrothermal liquefaction of duckweed and the influence of the extraction solvents," Fuel, vol. 185, pp. 229-235, Aug. 3, 2016.
F. Lin et al., "Recent Advances in Nonaqueous Extraction of Bitumen from Mineable Oil Sands: A Review," Organic Process Research & Development, vol. 21, pp. 492-510, Mar. 27, 2017.
J.M. Jarvis et al., "Hydrothermal Liquefaction Biocrude Compositions Compared to Petroleum Crude and Shale Oil," vol. 31, pp. 2896-2906, Feb. 7, 2017.
C.U. Jensen et al., "Fundamentals of Hydrofaction™M: Renewable crude oil from woody biomass," Biomass Conversion and Biorefinery, vol. 7(4), pp. 495-509, Feb. 23, 2017.
J. Jiang et al., "Influence of process conditions and interventions on metals content in biocrude from hydrothermal liquefaction of microalgae," Algal Research, vol. 26, pp. 131-134, Jul. 15, 2017.
B. Maddi et al., "Quantitative Characterization of Aqueous Byproducts from Hydrothermal Liquefaction of Municipal Wastes, Food Industry Wastes, and Biomass Grown on Waste," ACS Sustainable Chemistry & Engineering, vol. 5, pp. 2205-2214, Jan. 9, 2018.
J. Yang et al., "The impact of downstream processing methods on the yield and physiochemical properties of hydrothermal liquefaction bio-oil," Fuel Processing Technology, vol. 178, pp. 353-361, Jul. 13, 2018.
W.T. Chen et al., "Renewable diesel blendstocks produced by hydrothermal liquefaction of wet biowaste," Nature Sustainability, vol. 1, pp. 702-719, Nov. 13, 2018.
Castello et al., "Catalytic upgrading of hydrothermal liquefaction biocrudes: Different challenges for different feedstocks," Renewable Energy, vol. 141, pp. 420-430, 2019.
J. Watson et al., "Effects of the extraction solvents in hydrothermal liquefaction processes: Biocrude oil quality and energy conversion efficiency," Energy, vol. 167, pp. 189-197, Jan. 15, 2019.
W. Maqbool et al., "Extraction and Purification of Renewable Chemicals from Hydrothermal Liquefaction Bio-Oil Using Supercritical Carbon Dioxide: A Techno-economic Evaluation," Industrial & Engineering Chemistry Research, vol. 58(13), pp. 5202-5214, Mar. 7, 2019.
R.F. Beims, "Hydrothermal liquefaction of biomass to fuels and value-added chemicals: Products applications and challenges to develop large-scale operations," Biomass and Bioenergy, vol. 135, p. 105510, Feb. 25, 2020.
W.T. Chen et al., "A perspective on hydrothermal processing of sewage sludge," Current Opinion in Environmental Science & Health, vol. 14, pp. 63-73, Apr. 2020.
N. Montesantos et al., "Supercritical Carbon Dioxide Extraction of Lignocellulosic Bio-Oils: The Potential of Fuel Upgrading and Chemical Recovery," Energies, vol. 13, p. 1600, Apr. 1, 2020.
Z. Cui et al., "Co-hydrothermal liquefaction of wastewater-grown algae and crude glycerol: A novel strategy of bio-crude oil-aqueous separation and techno-economic analysis for bio-crude oil recovery and upgrading," Algal Research, vol. 51, p. 102077, Sep. 23, 2020.
"Primary Separation Cells," *Oil Sands Magazine* updated Mar. 3, 2021, https://www.oilsandsmagazine.com/technical/mining/extraction/psc-primary-separation-cell.
"Froth Treatment Explained," *Oil Sands Magazine*, updated Mar. 3, 2021, https://www.oilsandsmagazine.com/technical/mining/froth-treatment.
"Paraffinic Froth Treatment," *Oil Sands Magazine*, updated Mar. 3, 2021, https://www.oilsandsmagazine.com/technical/mining/froth-treatment/paraffinic.
"Naphthenic Froth Treatment," *Oil Sands Magazine*, updated Mar. 3, 2021, https://www.oilsandsmagazine.com/technical/mining/froth-treatment/naphthenic.
"Inclined Plate Separators," *Oil Sands Magazine*, updated Mar. 3, 2021, https://www.oilsandsmagazine.com/technical/mining/froth-treatment/naphthenic/inclined-plate-separator.
"Naphtha Recovery Units," *Oil Sands Magazine*, updated Mar. 3, 2021, https://www.oilsandsmagazine.com/technical/mining/froth-treatment/naphthenic/nru-naphtha-recovery-unit.
M.R. Thorson et al., "Scaleable Hydrotreating of HTL Biocrude to Produce Fuel Blendstocks," Energy & Fuels, vol. 35, pp. 11346-11352, Jun. 25, 2021.
M.S. Shankar et al., "Analysis of Existing Equations of Calculating the Settling Velocity," Water, vol. 13, p. 1987, Jul. 20, 2021.
A. Mathanker et al., "A Review of Hydrothermal Liquefaction of Biomass for Biofuel Production with a Special Focus on the Effects of Process Parameters, Co-Solvents, and Extraction Solvents," Energies, vol. 14, p. 4916, Aug. 11, 2021.
B. Zhao et al., "Influence of extraction solvents on the recovery yields and properties of bio-oils from woody biomass liquefaction in sub-critical water, ethanol or water-ethanol mixed solvent," Fuel, vol. 307, p. 121930, Sep. 9, 2021.
S. Subramaniam et al., "Extended Catalyst Lifetime Testing for HTL Biocrude Hydrotreating to Produce Fuel Blendstocks from Wet Wastes," ACS Sustainable Chemistry & Engineering, vol. 9, 12825-12832, Sep. 13, 2021.
B. Guo et al., "The Effect of Dichloromethane on Product Separation during Continuous Hydrothermal Liquefaction of *Chlorella vulgaris* and Aqueous Product Recycling for Algae Cultivation," Energy & Fuels, vol. 36, pp. 922-931, Jan. 4, 2022.
F. Cheng et al., "Best practices for bio-crude oil production at pilot scale using continuous flow reactors," *3rd Generation Biofuels*, edited by E. Jacob-Lopes, et al., Woodhead Publishing, Jun. 3, 2022, pp. 1061-1119.

(56) References Cited

OTHER PUBLICATIONS

H. Jahromi et al., "Hydrotreatment of solvent-extracted biocrude from hydrothermal liquefaction of municipal sewage sludge," Energy Conversion and Management, vol. 263, p. 115719, Jul. 1, 2022.

L. Jianwen et al., "110$^{th}$ Anniversary: Influence of Solvents on Biocrude from Hydrothermal Liquefaction of Soybean Oil, Soy Protein, Cellulose, Xylose, and Lignin, and Their Quinary Mixture," Industrial & Engineering Chemistry Research, vol. 58(31), pp. 13971-13976, Jul. 22, 2019.

"Petroleum & Other Liquids Data," *U.S. Energy Information Administration*, https://www.eia.gov/petroleum/data.php. Accessed Aug. 28, 2023.

\* cited by examiner

SOLVENT EXTRACTION SYSTEM AND PROCESS FOR HYDROTHERMAL LIQUEFACTION

ACKNOWLEDGMENT OF GOVERNMENT SUPPORT

This invention was made with government support under DE-AC05-76RL01830 awarded by U.S. Department of Energy. The government has certain rights in the invention.

FIELD

The present disclosure relates to hydrothermal liquefaction processes and systems for producing biocrude using solvent extraction processes.

BACKGROUND

Hydrothermal liquefaction ("HTL") is a processing technique than can convert a wide range of waste biological materials into a hydrocarbon liquid with similar properties to crude oil, often referred to as "biocrude" or "biocrude oil." A typical HTL system comprises a HTL reactor section, which processes the waste biological materials into a stable emulsion (which is also referred to as a "HTL emulsion," a "biocrude emulsion," and/or a "biocrude oil emulsion") comprising a biocrude oil phase, an aqueous phase, and solids.

The emulsion must be processed downstream of the HTL reactor section to separate the biocrude oil phase from the aqueous phase and solids. However, the emulsion is not amenable to phase separation at ambient conditions for several reasons. First, the biocrude oil phase does not readily separate from the aqueous phase because the biocrude oil phase and the aqueous phase can have similar specific gravities. Second, the solids do not readily separate from the biocrude oil phase and the aqueous phase because the solids can have surfaces with an affinity for the biocrude oil phase and/or the aqueous phase. Third, the emulsion (specifically the biocrude oil phase of the emulsion) can be viscous, which can inhibit the movement of aqueous phase droplets and solids through the emulsion. Accordingly, a need exists for improved processes and systems that can better separate or extract biocrude oil from HTL emulsions.

SUMMARY

The present disclosure relates to apparatuses, systems, and methods pertaining to the separation or extraction of biocrude oil from an HTL emulsion. As such, the apparatuses, systems, methods, and processes disclosed herein can, among other things, overcome one or more of the deficiencies of known HTL apparatuses, systems, methods, and processes.

In some examples, a system can comprise a biocrude oil emulsion source.

In some examples, the system can comprise a heat exchanger disposed downstream of the biocrude oil emulsion source, wherein the heat exchanger can be configured to cool a biocrude oil emulsion stream received from the biocrude oil emulsion source.

In some examples, the biocrude oil emulsion stream can comprise an emulsion including a biocrude oil phase, an aqueous phase, and solids.

In some examples, the system can comprise a first mixing vessel disposed downstream of the heat exchanger. The first mixing vessel can be configured to mix the emulsion with a solvent to dissolve the biocrude oil phase in the emulsion and form a biocrude-solvent solution.

In some examples, the system can comprise a first separator assembly disposed downstream of the first mixing vessel. The first separator assembly can be configured to separate the biocrude-solvent solution from the aqueous phase and the solids.

In some examples, the system can comprise a solvent recovery apparatus disposed downstream of the first separator assembly. The solvent recovery apparatus can be configured to separate biocrude oil and solvent from the biocrude-solvent solution.

In some examples, the system can comprise a second mixing vessel disposed downstream of the first separator assembly and disposed downstream of the solvent recovery apparatus. The second mixing vessel can be configured to mix solvent received from the solvent recovery apparatus with aqueous phase and solids received from the first separator assembly to dissolve biocrude oil remaining in the aqueous phase and the solids.

In some examples, the system can comprise a second separator assembly disposed downstream of the second mixing vessel. The second separator assembly can be configured to separate solvent and biocrude oil from the aqueous phase and solids received from the second mixing vessel and supply the solvent and biocrude oil to the first mixing vessel as the solvent.

In some examples, the system can comprise a water product stripper apparatus disposed downstream of the second separator assembly. The water product stripper apparatus can be configured to recover solvent from aqueous phase and solids received from the second separator assembly.

In some examples, the system can comprise a second heat exchanger disposed upstream of the water product stripper apparatus. The second heat exchanger can be configured to heat aqueous phase and solids entering the water product stripper apparatus.

In some examples, the second heat exchanger can be configured to cool aqueous phase and solids exiting the water product stripper apparatus.

In some examples, the system can comprise a de-oiling cyclone disposed downstream of the second separator assembly. The de-oiling cyclone can be configured to separate solvent from aqueous phase and solids received from the second separator assembly.

In some examples, the system can comprise a first condenser disposed downstream of the solvent recovery apparatus. The first condenser can be configured to condense solvent received from the solvent recovery apparatus.

In some examples, the system can comprise a second condenser disposed downstream of the first condenser. The second condenser can be configured to condense light hydrocarbons received from the first condenser.

In one representative example, a method can comprise: in a heat exchanger, cooling a biocrude oil emulsion stream received from a biocrude oil emulsion source, wherein the biocrude oil emulsion stream can comprise an emulsion including a biocrude oil phase, an aqueous phase, and solids; in a first mixing vessel, mixing the emulsion with a solvent to dissolve the biocrude oil phase and form a biocrude-solvent solution; in a first separator assembly, separating the biocrude-solvent solution from the aqueous phase and the solids; in a solvent recovery apparatus, recovering solvent from the biocrude-solvent solution; in a second mixing vessel, mixing the recovered solvent with the aqueous phase and the solids received from the first separator assembly to dissolve biocrude oil remaining in the aqueous phase and the solids; and providing the recovered solvent and dissolved biocrude oil to the first mixing vessel as the solvent.

In one representative example, a system can comprise: a biocrude oil emulsion source; a heat exchanger disposed downstream of the biocrude oil emulsion source, wherein the heat exchanger can be configured to cool a biocrude oil emulsion stream received from the biocrude oil emulsion source, and wherein the biocrude oil emulsion stream can comprise an emulsion including a biocrude oil phase, an aqueous phase, and solids; a first mixing vessel disposed downstream of the heat exchanger, wherein the first mixing vessel can be configured to mix the emulsion with a solvent to dissolve the biocrude oil phase in the emulsion and form a biocrude-solvent solution; a first separator assembly disposed downstream of the first mixing vessel, wherein the first separator assembly can be configured to separate the biocrude-solvent solution from the aqueous phase and the solids; a solvent recovery apparatus disposed downstream of the first separator assembly, wherein the solvent recovery apparatus can be configured to separate biocrude oil and solvent from the biocrude-solvent solution; a second mixing vessel disposed downstream of the first separator assembly and disposed downstream of the solvent recovery apparatus, wherein the second mixing vessel can be configured to mix solvent received from the solvent recovery apparatus with aqueous phase and solids received from the first separator assembly to dissolve biocrude oil remaining in the aqueous phase and the solids; and a second separator assembly disposed downstream of the second mixing vessel, wherein the second separator assembly can be configured to separate solvent and biocrude oil from the aqueous phase and solids received from the second mixing vessel and supply the solvent and biocrude oil to the first mixing vessel as the solvent.

In one representative example, a system can comprise: a HTL reactor system configured to produce an emulsion comprising biocrude oil and an aqueous phase; and a HTL solvent extraction system disposed downstream of the HTL reactor system. The HTL solvent extraction system can comprise: a mixing vessel disposed downstream of the HTL reactor system, wherein the mixing vessel is configured to mix the emulsion with a solvent; a separator assembly disposed downstream of the mixing vessel, wherein the separator assembly is configured to receive the emulsion mixed with the solvent and separate the biocrude oil and the solvent from the aqueous phase; and a solvent recovery apparatus disposed downstream of the separator assembly, wherein the solvent recovery apparatus is configured to separate the biocrude oil from the solvent.

The foregoing and other objects, features, and advantages of the disclosed technology will become more apparent from the following detailed description, which proceeds with reference to the accompanying figures.

DETAILED DESCRIPTION

Explanation of Terms

Figure 1:
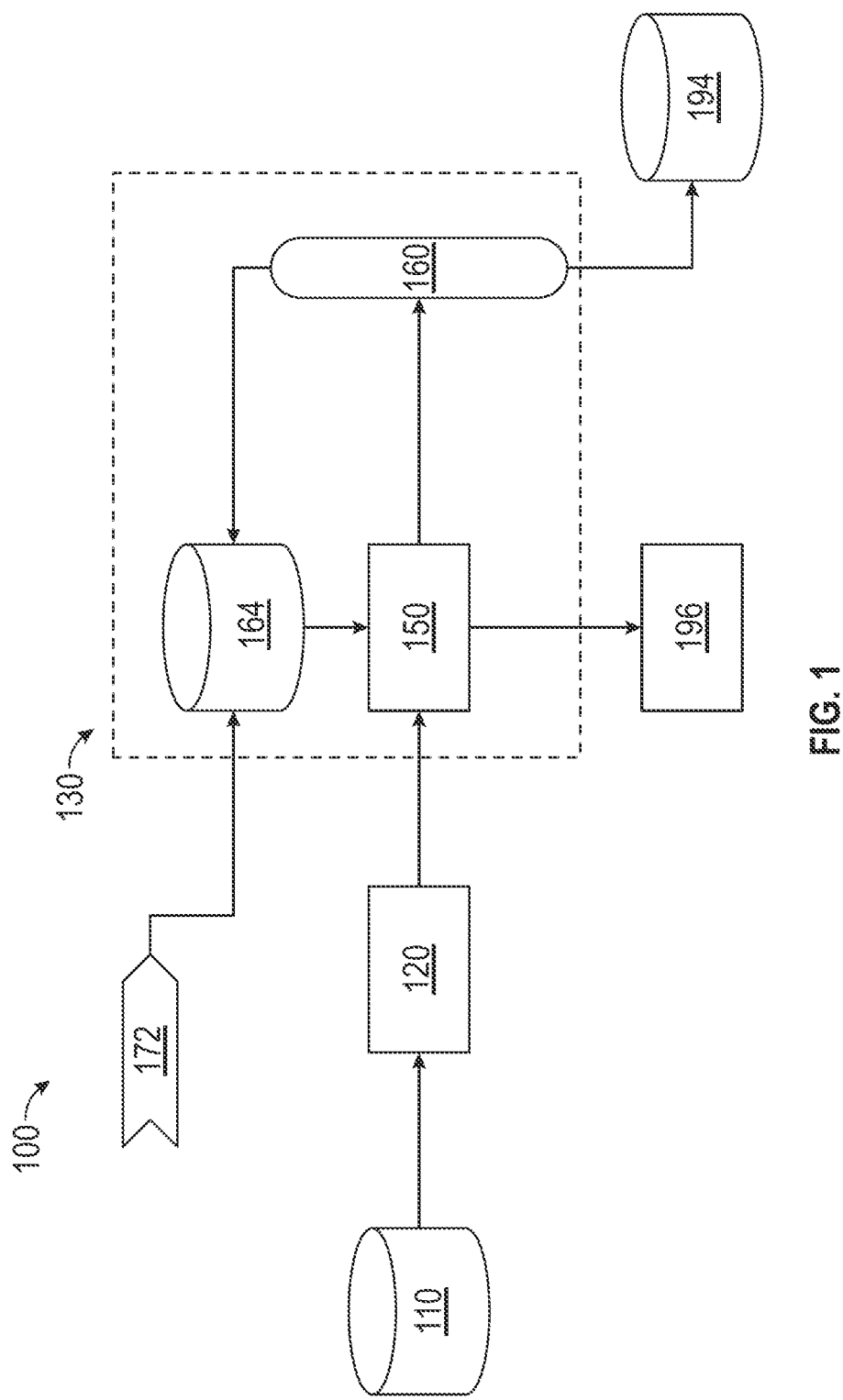
FIG. 1 is a schematic diagram of a biocrude oil production system using HTL, according to one example.

For purposes of this description, certain aspects, advantages, and novel features of the embodiments of this disclosure are described herein. The disclosed methods, apparatus, and systems should not be construed as being limiting in any way. Instead, the present disclosure is directed toward all novel and nonobvious features and aspects of the various disclosed embodiments, alone and in various combinations and sub-combinations with one another. The methods, apparatus, and systems are not limited to any specific aspect or feature or combination thereof, nor do the disclosed embodiments require that any one or more specific advantages be present or problems be solved.

Although the operations of some of the disclosed embodiments are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

As used in this disclosure and in the claims, the singular forms "a," "an," and "the" include the plural forms unless the context clearly dictates otherwise. Additionally, the term "includes" means "comprises." Further, the terms "coupled" and "associated" generally mean electrically, electromagnetically, and/or physically (e.g., mechanically or chemically) coupled or linked and does not exclude the presence of intermediate elements between the coupled or associated items absent specific contrary language.

In some examples, values, procedures, or apparatus may be referred to as "lowest," "best," "minimum," or the like. It will be appreciated that such descriptions are intended to indicate that a selection among many alternatives can be made, and such selections need not be better, smaller, or otherwise preferable to other selections.

In the description, certain terms may be used such as "up," "down," "upper," "lower," "horizontal," "vertical," "left," "right," and the like. These terms are used, where applicable, to provide some clarity of description when dealing with relative relationships. But these terms are not intended to imply absolute relationships, positions, and/or orientations. For example, with respect to an object, an "upper" surface can become a "lower" surface simply by turning the object over. Nevertheless, it is still the same object.

As used in this disclosure and in the claims, terms such as "upstream" and "downstream" refer to the relative relationships of certain unit operations and/or components in a process or system, respectively. Unless otherwise indicated, such terms allow for the existence of intervening unit operations or components between corresponding upstream and downstream unit operations or components. Thus, the use of such terms does not require that an "upstream" unit operation and/or equipment be in direct connection with a corresponding "downstream" unit operation and/or component, or vice versa.

Various schemes, systems, and assemblies disclosed throughout this application comprise various components such as mixing vessels, pumps, heat exchangers, separator assemblies, solvent recovery apparatuses, water product strippers, knockout drums, tanks, reactors, and valves. It should be understood that any of the examples disclosed herein can include any number of such components in parallel and/or in series, according to the particular requirements of a system.

Unless otherwise indicated, all numbers expressing quantities of components, pressures, dimensions, forces, moments, molecular weights, percentages, temperatures, times, and so forth, as used in the specification or claims are to be understood as being modified by the term "about." Accordingly, unless otherwise indicated, implicitly or explicitly, the numerical parameters set forth are approximations that can depend on the desired properties sought and/or limits of detection under test conditions/methods familiar to those of ordinary skill in the art. When directly and explicitly distinguishing embodiments from discussed prior art, the embodiment numbers are not approximations unless the word "about" is recited. Furthermore, not all alternatives recited herein are equivalents.

Although this application may describe certain components and/or features as associated with certain sizes, dimensions, and/or flow rates, it should be understood that components and/or features can be scaled up or down in accordance with various implementations of the HTL solvent extraction system. The described components can also be rearranged, and/or additional components can be included such as valves, pipes, drains, etc., depending upon the particular application.

For simplicity and conciseness, this application may not illustrate or describe all the various examples of instrumentation that can be used to measure the operating conditions of the various components (such as mixing vessels, pumps, heat exchangers, separator assemblies, solvent recovery apparatuses, water product strippers, knockout drums, reactors, tanks, valves, etc.) described herein. Thus, unless otherwise noted, each component described in this application can be coupled to any combination of level instrumentation, pressure instrumentation, temperature instrumentation, flow rate instrumentation, and/or any other instrumentation for measuring relevant operating conditions of the disclosed technology. The selected combination of instrumentation may depend on the needs of the particular implementation of the disclosed technology. Furthermore, any combination of instrumentation may be used to monitor any step or process of the disclosed technology. Finally, it should be understood that the instrumentation can be coupled to one or more controllers for controlling the disclosed technology.

As used herein, an "emulsion" is a stable mixture of two or more immiscible substances wherein one substance (i.e., the dispersed phase or minor component) is dispersed within the other (i.e., the continuous phase or major component). For example, cream is an emulsion in which water surrounds droplets of oil, i.e., an oil-in-water emulsion. In the biocrude oil-water emulsion examples described herein, the continuous phase comprises water and the dispersed phase comprises biocrude oil droplets and/or solid particles coated in biocrude oil and dispersed in the aqueous phase.

Overview of the Disclosed Technology

Hydrothermal liquefaction ("HTL") is a processing technique than can convert a wide range of wet waste biological materials (which are also referred to herein as "biomass" and/or a "biomass feed") into a hydrocarbon liquid with similar properties to crude oil. This hydrocarbon liquid is referred to herein as "biocrude," "biocrude oil," and/or "biocrude product." One characteristic of the HTL process is that the HTL reaction can occur in the aqueous phase; thus, HTL does not require the biomass feed to be dried before processing. Many biomass feeds, notably food and municipal waste, can mostly comprise water so avoiding drying can, in some examples, save large amounts of energy and can further simplify the conversion of biomass feed to biocrude oil. For at least this reason, HTL can in some examples be advantageous over other waste conversion technologies, such as pyrolysis or incineration.

Typical HTL processes and systems can convert biomass into an emulsion (which is also referred to herein as a "HTL emulsion," a "biocrude emulsion," and/or a "biocrude oil emulsion"). The emulsion can comprise a combination of a biocrude oil phase (which is also referred to herein as "biocrude," "biocrude oil," and/or "biocrude product"), solids (which are also referred to herein as a "solid product"), and an aqueous phase (which is also referred to herein as "aqueous product"). The solids can be formed from inorganic material (e.g., metals, grit) and/or high molecular weight hydrocarbons precipitated during the HTL process. In some examples, the solids can comprise fine particulates with diameters of less than 5 microns. The aqueous phase can comprise water and any of various solutes and/or other liquids (e.g., dissolved oxygenates, nitrogen containing organics, ammonium salts, other dissolved salts, acetic acid, ethanol, and other lower molecular weight polar compounds).

Since the desired end product of the HTL process is biocrude oil, some HTL processes and systems can include steps, systems, and/or apparatuses for separating the biocrude oil phase of the emulsion from the solids and the aqueous phase of the emulsion. Previous techniques for separating the biocrude oil phase from solids and the aqueous phase have included gravity separation and mechanical filtration. However, gravity separation techniques can be slow and inefficient because (1) the biocrude oil phase and the aqueous phase can have similar specific gravities, resulting in long settling times, (2) the solids can have surfaces with an affinity for the biocrude oil phase and/or the aqueous phase, and (3) the emulsion (specifically the biocrude oil phase of the emulsion) can be viscous, which can inhibit the movement of aqueous phase droplets and solids through the emulsion. Furthermore, mechanical filtration techniques can decrease the reliability and/or throughput of HTL systems because (1) filters can become clogged with accumulated solids and (2) filters (especially filters configured to capture small particles) can restrict the flow rate of emulsion through the HTL system. As such, conventional gravity separation and mechanical filtration techniques may present deficiencies that render such techniques unsuitable for large-scale HTL operations, which in some examples can benefit from quick, efficient, and reliable techniques for extracting biocrude oil from the emulsion.

Accordingly, a need exists for improved processes, methods, systems, and apparatuses for separating and extracting biocrude oil from emulsions, especially technologies that can be implemented in large-scale HTL operations.

Example 1: First Representative HTL Solvent Extraction System

FIG. 1 is a schematic diagram of a biocrude oil production system 100 using HTL, according to one example. The illustrated biocrude oil production system 100 can address some of the deficiencies of the prior art by mixing the emulsion with solvents to separate or extract the biocrude oil phase from the solids and the aqueous phase. In some examples, systems and processes that use solvents to extract the biocrude oil phase can be faster than systems and processes that rely on conventional gravity separation techniques alone because the solvent and aqueous phase can have different densities. In some examples, systems and processes that use solvents to extract the biocrude oil can be more reliable or efficient than filter-based systems because solvents can be less prone to clogging. Thus, the illustrated biocrude oil production system 100 (as well as any other HTL solvent extraction systems and processes disclosed herein) can beneficially separate or extract the biocrude oil phase in a faster, more efficient, and more reliable manner than gravity separation and mechanical filtration techniques.

The biocrude oil production system 100 can comprise a biomass feed source 110, a HTL reactor system 120 disposed downstream of the biomass feed source 110, a HTL solvent extraction system 130 disposed downstream of the HTL reactor system 120, a makeup solvent source 172 disposed upstream of the HTL solvent extraction system 130, a biocrude product storage 194 disposed downstream of the HTL solvent extraction system 130, and a wastewater treatment plant 196 disposed downstream of the HTL solvent extraction system 130.

The biomass feed source 110 can be configured to provide a biomass feed stream to the HTL reactor system 120. The biomass feed stream can comprise a biomass feed. The biomass feed (and/or any biomass feed disclosed herein) can comprise a mixture of an aqueous phase and organic material solids. In some examples, the aqueous phase can comprise water. In some examples, the biomass feed stream can comprise 60% to 95% water by mass, such as 75% to 90%, 70% to 85%, and/or 75% to 80%. In some examples, the solids can comprise 5% to 40% of the biomass feed by mass, such as 10% to 35%, 15% to 30%, and/or 20% to 25%.

The HTL reactor system 120 can be configured to process the biomass feed stream received from the biomass feed source 110 to form an emulsion stream comprising an emulsion of a biocrude oil phase, solids, and an aqueous phase. In some examples, the biocrude oil phase can comprise 1% to 25% of the emulsion by mass, such as 2.5% to 22.5%, 5% to 20%, 7.5% to 17.5%, and/or 10% to 15%. In some examples, the solids can comprise 1% to 20% of the emulsion by mass, such as 5% to 15%, and/or 7.5% to 12.5%. In some examples, the aqueous phase can comprise 60% to 95% of the emulsion, such as 75% to 90%, 70% to 85%, and/or 75% to 80%.

The HTL reactor system 120 can comprise a HTL reactor configured to process biomass feed from the biomass feed stream under elevated temperature and pressure to form the emulsion stream. In some examples, the HTL reactor can comprise an autothermal reactor (e.g., a wet air oxidation reactor or a supercritical water oxidation reactor) configured to oxidize biomass feed under elevated temperature and pressure to spontaneously combust the biomass feed. In some examples, the HTL reactor system 120 can comprise various components (e.g., heat exchangers, pumps, pressure letdown valves, mixing vessels, etc.) to heat/cool, pressurize/depressurize, and/or mix the incoming biomass feed stream and/or the outgoing emulsion stream. Further details regarding HTL reactor systems that can be used in combination with the solvent recovery systems described herein can be found in U.S. Pat. Nos. 9,758,728, 10,167,430, 11,279,882, and U.S. application Ser. No. 18/352,551, each of which is incorporated herein by reference in its entirety.

The HTL solvent extraction system 130 can be configured to separate or extract biocrude oil from the solids and/or aqueous phase of the emulsion stream received from the HTL reactor system 120. The HTL solvent extraction system 130 can comprise a separator assembly 150, a solvent recovery apparatus 160 disposed downstream of the separator assembly 150, and a solvent recovery accumulation tank 164 disposed downstream of the solvent recovery apparatus 160 and upstream of the separator assembly 150.

The separator assembly 150 can be configured to receive the emulsion stream from the HTL reactor system 120 and can be further configured to receive a solvent stream from the solvent recovery accumulation tank 164. The separator assembly 150 can be configured to mix the received emulsion stream and the received solvent stream. As discussed later in this application, the solvent stream can comprise a solvent configured to dissolve at least a portion of the biocrude oil phase. In certain examples, the solids and the aqueous phase of the emulsion are not significantly soluble in the solvent. Furthermore, in some examples, the solvent can have a different density (e.g., a lower density, a higher density) than any one of the aqueous phase and/or the biocrude oil phase. Thus, when the separator assembly 150 mixes the emulsion stream and the solvent stream, the separation assembly 150 can form an emulsion-solvent stream comprising a biocrude oil-solvent portion (which is also referred to herein as a "biocrude-solvent solution") and an aqueous-solids portion (which is also referred to herein as an "aqueous-solids mixture").

In some examples, the separator assembly 150 can comprise a mixing vessel configured to mix the emulsion stream and the solvent stream. In some examples, the mixing vessel (and/or any mixing vessel disclosed herein) can comprise a static mixer (e.g., an inline mixer) and/or a dynamic mixer (e.g., a centrifugal pump or other motorized machinery). In some examples, the static mixer can comprise a plurality of orifice plates or sharp edges configured to induce turbulence in the emulsion-solvent stream.

The separator assembly 150 can be configured to subsequently separate the biocrude oil-solvent portion from the aqueous-solids portion into a biocrude oil-solvent stream and an aqueous-solids stream, respectively. Since the solvent can be less dense than the aqueous phase, the solvent and the biocrude dissolved therein can phase separate from the mixture of the aqueous phase and the solids. Furthermore, since the solvent can be less dense than the aqueous phase, the phase separation of the solvent and aqueous phase can occur faster than the phase separation of the biocrude oil phase and the aqueous phase (which has a similar density to the biocrude oil phase) in separation techniques that do not include such solvents.

In some examples, the separator assembly 150 can comprise a settling vessel configured to separate or phase-separate the biocrude oil-solvent portion from the aqueous-solids portion. In some examples, the separator assembly can comprise various internal components (e.g., an inclined plate separator, a diffusor, a collection trough, a chimney tray, an overflow weir, a stilling well, a nozzle, or combinations thereof) to facilitate the phase separation and/or reduce fouling inside the settling vessel.

In some examples, the separator assembly 150 can comprise a plurality of alternating mixing vessels and settling vessels arranged in series to further separate the biocrude oil-solvent portion from the aqueous-solids portion. In such examples, adding additional mixing vessels and/or settling vessels can further increase the efficiency of the separator assembly 150.

The aqueous-solids stream can be piped to the wastewater treatment plant 196 disposed downstream of the separator assembly 150. In some examples, the aqueous-solids stream can be further processed to separate the solids and the aqueous phase, thereby allowing at least a portion of the aqueous phase to be recovered or recycled and at least a portion of the solids to be further processed in a downstream operation.

The solvent recovery apparatus 160 can be configured to receive the biocrude oil-solvent stream from the separator assembly 150. The solvent recovery apparatus 160 can be configured to separate the biocrude oil from the solvent to form a biocrude oil stream and a recovered solvent stream, respectively. The biocrude oil stream can be piped to the biocrude product storage 194 disposed downstream of the solvent recovery apparatus 160.

In some examples, the solvent recovery apparatus 160 can distill the solvent from the biocrude oil-solvent stream, resulting in a pure or substantially pure biocrude oil stream. In some examples, the solvent recovery apparatus 160 can distill a selected proportion of the solvent from the biocrude oil-solvent stream. In such examples, leaving a portion (comprising, for example, 1% to 10%, such as 3% to 9%, 4% to 8%, and/or 5% to 7% of the biocrude oil stream by mass) of the solvent in the biocrude oil stream can beneficially improve the flow properties of the biocrude oil stream and/or function as a solvent purge to maintain a particular solvent purity. In some examples, the solvent recovery apparatus 160 can operate under a vacuum or a partial vacuum (e.g., a pressure less than ambient atmospheric pressure) to beneficially perform the solvent distillation at a lower temperature to reduce energy costs and/or to further reduce potential corrosion reactions within the solvent recovery apparatus 160.

In some examples, the solvent recovery apparatus 160 (and/or any solvent recovery apparatus disclosed herein) can comprise a fractional distillation tower (which is also referred to herein as a "distillation tower," a "fractional distillation column," and/or a "distillation column"). The fractional distillation tower can be configured to distill at least a portion the solvent from the biocrude oil-solvent stream.

The solvent recovery accumulation tank 164 can be configured to receive the recovered solvent stream from the solvent recovery apparatus 160 and can further receive a makeup solvent stream from the makeup solvent source 172 disposed upstream of the solvent recovery accumulation tank 164. The solvent recovery accumulation tank 164 can be configured to accumulate solvent therein and provide solvent to the separator assembly 150 via the solvent stream.

The makeup solvent source 172 can be configured to supplement the HTL solvent extraction system 130 with solvent to make up for any solvent lost during the solvent extraction process (e.g., solvent lost to the biocrude product storage 194 and/or the wastewater treatment plant 196). In some examples, the makeup solvent source 172 can comprise a refinery configured to process biocrude oil. As further discussed later in this application, receiving solvent from the refinery configured to process biocrude oil can beneficially create an at least partially closed loop in which any solvent remaining in the biocrude oil product sent to the refinery can be recovered and re-introduced into the HTL solvent extraction system 130 via the makeup solvent source 172. Thus, such a closed loop can further reduce solvent loss throughout the entire biocrude oil production process.

Example 2: Second Representative HTL Solvent Extraction System

Figure 2:
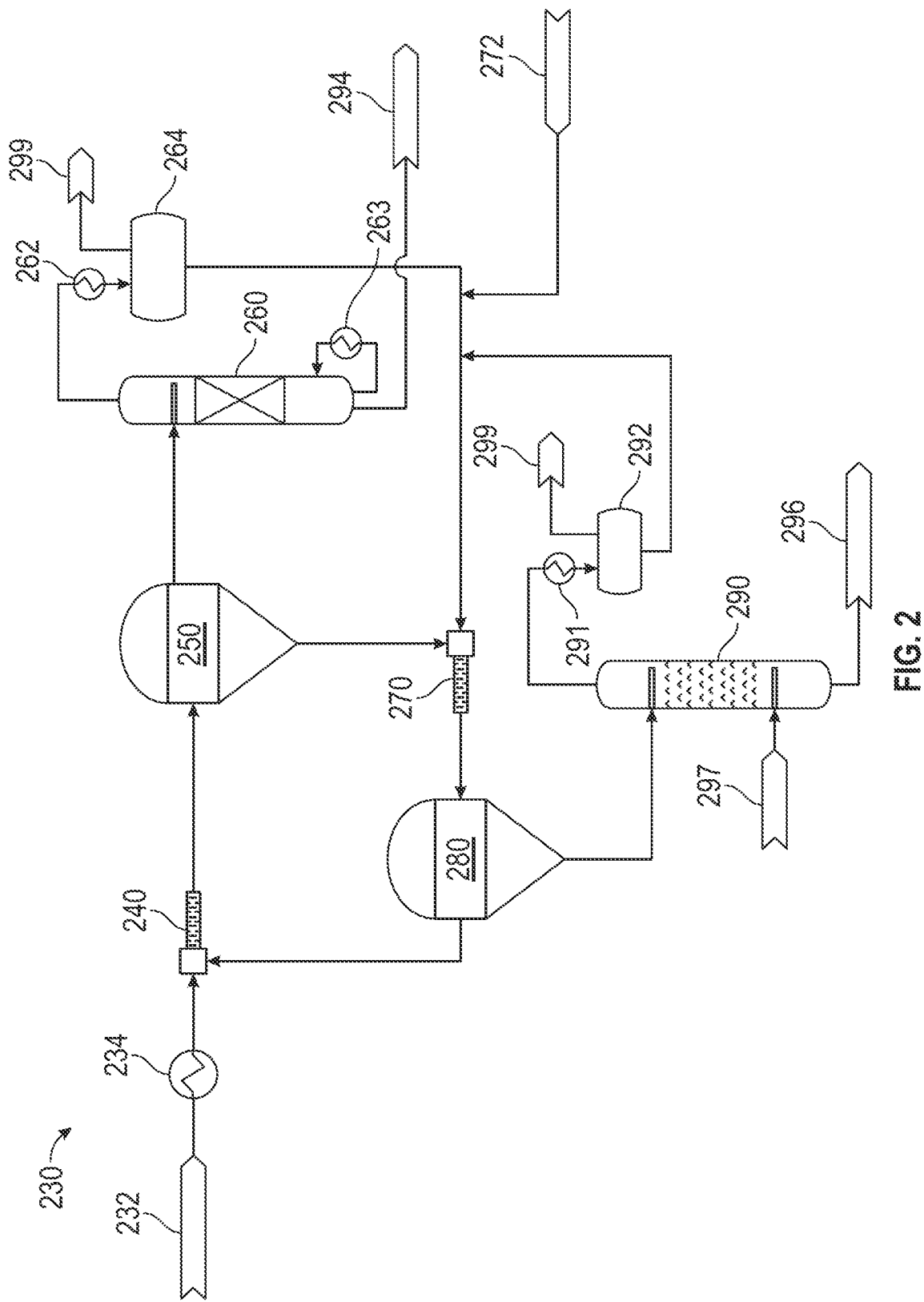
FIG. 2 is a schematic diagram of a HTL solvent extraction system, according to one example.

FIG. 2 is a schematic diagram of a HTL solvent extraction system 230, according to one example. The HTL solvent extraction system 230 can comprise an emulsion source 232, a heat exchanger 234 disposed downstream of the emulsion source 232, a first mixing vessel 240 disposed downstream of the heat exchanger 234, a first separator assembly 250 disposed downstream of the first mixing vessel 240, a solvent recovery apparatus 260 disposed downstream of the first separator assembly 250 and upstream of a second mixing vessel 270, the second mixing vessel 270 disposed downstream of the first separator assembly 250 and the solvent recovery apparatus 260, a second separator assembly 280 disposed downstream of the second mixing vessel 270 and upstream of the first mixing vessel 240, and a water product stripper apparatus 290 disposed downstream of the second separator assembly 280.

The emulsion source 232 can be configured to provide an emulsion stream to the heat exchanger 234. In some examples, the emulsion source 232 can comprise a HTL reactor system (similar to HTL reactor system 120) that converts a biomass feed stream into the emulsion stream. The emulsion stream can comprise the emulsion including the biocrude oil phase, the solids, and the aqueous phase. In some examples, the biocrude oil phase can comprise 1% to 25% of the emulsion by mass, such as 2.5% to 22.5%, 5% to 20%, 7.5% to 17.5%, and/or 10% to 15%. In some examples, the solids can comprise 1% to 20% of the emulsion by mass, such as 5% to 15%, and/or 7.5% to 12.5%. In some examples, the aqueous phase can comprise 60% to 95% of the emulsion by mass, such as 75% to 90%, 70% to 85%, and/or 75% to 80%.

The heat exchanger 234 can be configured to cool the emulsion stream received from the emulsion source 232 to a target temperature. Unlike some separation systems like mechanical filters, which operate at high temperatures, the disclosed HTL solvent extraction system 230 can operate at relatively cooler temperatures, thereby further improving the safety and reliability of the HTL solvent extraction system 230. For example, processing the emulsion stream at a relatively cool temperature (as compared to the temperatures at which mechanical filters and/or HTL reactors typically operate) can help reduce the cost, technical expertise, infrastructure, and/or other requirements needed to operate the HTL solvent extraction system 230. In some examples, the target temperature can be in a range from 20° C. to 100° C., such as from 30° C. to 90° C., from 40° C. to 80° C., from 20° C. to 65° C., from 20° C. to 50° C., from 20° C. to 40° C., from 25° C. to 45° C., from 30° C. to 40° C., and/or from 35° C. to 40° C.

In some examples, the heat exchanger 234 (and/or any heat exchanger disclosed herein) can comprise a spiral heat exchanger. In such examples, the spiral heat exchanger can be more resistant to fouling than other types of heat exchangers. In such examples, the selection of a fouling-resistant heat exchanger can help prevent or reduce fouling caused by the high solids content of the emulsion. However, the heat exchanger 234 (and/or any heat exchanger disclosed herein) can comprise any type of heat exchanger, such as a shell-and-tube heat exchanger.

The first mixing vessel 240 can be configured to receive an emulsion stream from the heat exchanger 234 and can be further configured to receive a biocrude oil-solvent stream from the second separator assembly 280. The biocrude oil-solvent stream can comprise biocrude oil dissolved in solvent. The first mixing vessel 240 can be configured to mix the emulsion stream and the biocrude-oil solvent stream to dissolve the biocrude oil of the emulsion stream in the solvent of the biocrude oil-solvent stream. In some examples, the first mixing vessel 240 can form an emulsion-solvent stream comprising a biocrude oil-solvent portion and an aqueous-solids portion. In some examples, using the first mixing vessel 240 to mix the emulsion stream and the biocrude oil-solvent stream can further increase the interfacial surface area between the emulsion stream and the biocrude oil-solvent stream, thereby resulting in a higher mass transfer rate for the extraction of biocrude oil.

The first separator assembly 250 (which is also referred to herein as a "first settling vessel") can be configured to receive the emulsion-solvent stream. The first separator assembly 250 can be configured to further separate or extract the biocrude oil-solvent portion of the emulsion-solvent stream from the aqueous-solids portion of the emulsion-solvent stream into a biocrude oil-solvent stream and an aqueous-solids stream, respectively. The biocrude oil-solvent stream can comprise the biocrude oil phase dissolved in solvent. The aqueous-solids stream can primarily comprise solids mixed with the aqueous phase. Although the purpose of the first separator assembly 250 can be to separate as much of the biocrude oil phase and solvent from the aqueous phase and solids as possible, some examples of the aqueous-solids stream can further comprise remaining solvent and/or biocrude oil in the aqueous phase (e.g., biocrude oil droplets entrained in the aqueous phase).

Figures 3A, 3B:
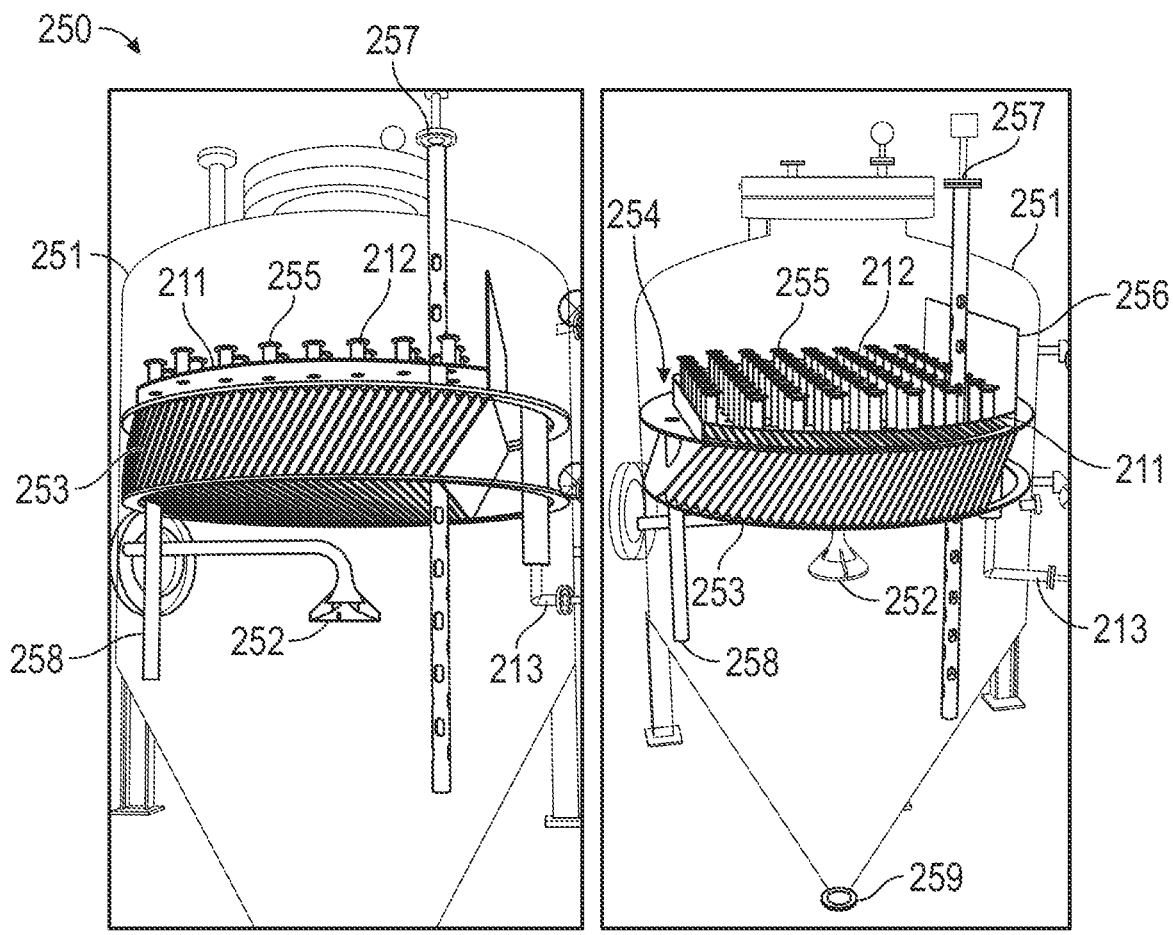
FIG. 3A is an internal, bottom-up perspective view of a separator assembly, according to one example.
FIG. 3B is an internal, top-down perspective view of the separator assembly of FIG. 3A.

Now referring to FIGS. 3A-3B, some examples of the first separator assembly 250 (such as the illustrated example) can comprise a first settling vessel 251. The first settling vessel 251 can comprise various internal components therein, wherein the internal components can be configured to facilitate the separation of the biocrude oil-solvent portion from the aqueous-solids portion. For example, the first settling vessel 251 can comprise any combination of an emulsion diffusor 252, an inclined plate separator 253, an aqueous phase collection trough 254, a chimney tray 255 including a plate 211 that divides an upper portion of the first settling vessel 251 from a lower portion of the first settling vessel 251 and a plurality of conduits 212 (which are also referred to herein as "chimneys") extending through the plate 211 that place the lower portion of the first settling vessel 251 in fluid communication with the upper portion. The first settling vessel 251 can further comprise a hydrocarbon product overflow weir 256, a liquid-liquid level interface stilling well 257, a biocrude/solvent outlet nozzle 213, an aqueous phase return pipe 258, and/or an aqueous phase outlet nozzle 259.

The emulsion-solvent stream can enter the first settling vessel 251 through the emulsion diffusor 252 (which is also referred to herein as a "diffusor"), which can be configured to distribute the incoming emulsion-solvent stream to a bottom-center portion of the first settling vessel 251. The emulsion diffusor 252 can be sized to promote laminar flow to minimize turbulence inside the first settling vessel 251. The flow direction of the emulsion-solvent stream can be directed in a downward direction of the first settling vessel 251 to minimize the presence of the aqueous phase and solids in the resulting biocrude oil-solvent stream. In some examples, the emulsion diffusor 252 can further comprise a deflection plate configured to further diffuse the emulsion-solvent stream exiting the emulsion diffusor 252.

Since the biocrude oil and solvent can be less dense than the aqueous phase, the biocrude oil and solvent can float upwards through the inclined plate separator 253, which can be disposed above the emulsion diffusor 252. The inclined plate separator 253 can be configured to coalesce droplets of biocrude oil and solvent to a continuous phase. The inclined plate separator 253 can comprise one or more plates on which the droplets coalesce. In some examples, each plate can have a vertical slope of greater than 55° to prevent the solids from building up on and/or fouling the inclined plate separator 253.

The biocrude oil and solvent can float upwards from the inclined plate separator 253 to the chimney tray 255, which can be disposed above the inclined plate separator 253. The chimney tray 255 can be configured to calm the continuous phase of biocrude oil and solvent flowing upwards through the at least one conduit 212 and can be further configured to catch any remaining droplets of the aqueous phase that settle on the plate 211 of the chimney tray 255 and can further direct the aqueous phase droplets to the aqueous phase collection trough 254.

The aqueous phase collection trough 254 can comprise a return pipe extending from the plate 211 of the chimney tray 255 to a bottom portion of the first settling vessel 251. The aqueous phase collection trough 254 can be configured to transport any aqueous phase droplets captured by the chimney tray 255 to the bottom portion of the first settling vessel 251.

The aqueous-solids phase can exit the first settling vessel 251 through the aqueous phase outlet nozzle 259, which can be disposed at the bottom portion of the first settling vessel 251.

The biocrude oil and solvent flowing out of the chimney tray 255 can overflow the hydrocarbon product outlet weir 256 and can exit the first settling vessel 251 via the outlet nozzle 213, which can be disposed on the other side of the hydrocarbon product outlet weir 256 from the chimney tray 255. The liquid-liquid level interface stilling well 257 can be configured to isolate a portion of the biocrude oil and solvent overflowing the hydrocarbon product outlet weir 256, for example, to facilitate the measurement of the liquid level of the overflowing biocrude oil and solvent.

Although FIGS. 3A-3B illustrate one representative example of the first separator assembly 250, it should be understood that any separator assembly disclosed herein (e.g., any one of separator assemblies 150, 250, 280, 350, 380, 450, 480, etc.) can comprise any combination of the aforementioned internal components and/or any other apparatus configured to separate the biocrude oil-solvent phase from the aqueous-solids phase.

Referring again to FIG. 2, the solvent recovery apparatus 260 can be configured to receive the biocrude oil-solvent stream from the first separator assembly 250. The solvent recovery apparatus 260 can be configured to separate the biocrude oil and solvent to extract the biocrude oil from the biocrude oil-solvent stream. In some examples, the solvent in the biocrude oil-solvent stream can be more volatile than the biocrude oil, so at least a portion of the solvent can be vaporized and thus separated from the biocrude oil. The solvent recovery apparatus 260 can form a biocrude oil stream from the separated biocrude oil. A biocrude oil product storage 294 disposed downstream of the solvent recovery apparatus 260 can be configured to receive the biocrude oil stream. In some examples, the solvent recovery apparatus 260 can help reduce solvent demand by beneficially recovering the solvent for recycling within the HTL solvent extraction system 230.

In some examples, all or substantially all the solvent can be separated from the biocrude oil, such that the biocrude oil stream is substantially pure. In some examples, separating substantially all the solvent from the biocrude oil can beneficially minimize the amount of makeup solvent that must be added to the HTL solvent extraction system 230. In some examples, a portion of solvent is not separated from the biocrude oil, such that the biocrude oil stream comprises biocrude oil and a target concentration of solvent. In some examples, the target concentration of solvent can be from 0.1% to 10%, such as from 1% to 10%, from 2% to 8%, from 3% to 7%, from 3.5% to 6.5%, from 4% to 6%, and/or from 4.5% to 5.5%. In some examples, retaining the target concentration of solvent in the biocrude oil stream can beneficially improve the flow properties of the biocrude oil stream and/or reduce the cost of operating the HTL solvent extraction system 230. In some examples, excess and/or contaminated solvent can be retained in the biocrude oil stream to function as a solvent purge to maintain the solvent purity within acceptable limits. In such examples, purging solvent may also help purge contaminants-such as naphtha boiling range molecules-mixed with the solvent from the HTL solvent extraction system 230. Such purging can be beneficial because, in some examples, naphtha molecules can detrimentally stabilize the biocrude oil in the aqueous phase, making biocrude oil extraction more difficult.

In some examples, the solvent recovery apparatus 260 can further comprise a solvent recovery reboiler 263 or any other type of heating element (e.g., a steam stream) configured to heat the biocrude oil-solvent stream, such that at least a portion of the solvent can vaporize and exit a top portion of the solvent recovery apparatus 260. The un-vaporized biocrude oil can exit a bottom portion of the solvent recovery apparatus 260.

In some examples, the solvent recovery apparatus 260 can be operated under mild vacuum to perform the separation at lower temperatures. In some examples, the solvent recovery apparatus 260 can be operated at a pressure from 1 kPa to 100 kPa, such as from 10 kPa to 90 kPa, from 20 kPa to 80 kPa, from 30 kPa to 70 kPa, from 40 kPa to 60 kPa, and/or from 45 kPa to 50 kPa. Performing the separation of the biocrude oil and solvent under a mild vacuum at lower temperatures can, in some examples, help prevent the buildup of corrosive substances formed at high temperatures within the solvent recovery apparatus 260 and/or reduce the amount of energy needed to heat the biocrude oil-solvent stream.

The solvent separated from the biocrude oil by the solvent recovery apparatus 260 can be formed into a vaporized solvent stream. In some examples, the solvent recovery apparatus 260 can provide the vaporized solvent stream to a solvent recovery condenser 262 disposed downstream of the solvent recovery apparatus 260. The solvent recovery condenser 262 can be configured to cool and/or condense the vaporized solvent, for example, to a liquid state. This can beneficially allow the recovered solvent to be stored in a solvent recovery accumulation tank 264 disposed downstream of the solvent recovery condenser 262.

Any offgas that is not condensed by the solvent recovery condenser 262 can be vented to an offgas outlet 299 disposed downstream of the solvent recovery accumulator 264.

The second mixing vessel 270 can be configured to receive the aqueous-solids stream from the first separator assembly 250 and a solvent stream, and further mix the streams to form a resulting emulsion-solvent stream. The solvent stream can comprise any combination of recovered solvent from the solvent recovery accumulation tank 264, makeup solvent from a makeup solvent source 272 disposed upstream of the second mixing vessel 270 and recovered solvent from a knockout drum 292 disposed upstream of the second mixing vessel 270. The makeup solvent 272 can be added to the solvent stream to replace solvent lost during the solvent extraction process (e.g., solvent sent to the biocrude product storage 294 in the biocrude oil stream). As shown, the recovered solvent from the solvent recovery accumulation tank 264, the makeup solvent from a makeup solvent source 272, and the recovered solvent from the knockout drum 292 can be combined or mixed before the solvent stream enters the second mixing vessel 270. However, in some examples, the second mixing vessel 270 can be configured to receive the aqueous-solids stream and any combination of three streams: a recovered solvent stream from the solvent recovery accumulation tank 264, a makeup solvent stream from the makeup solvent source 272, and a recovered solvent stream from the knockout drum 292. The second mixing vessel 270 can be configured to mix the aqueous phase and solids from the aqueous-solids stream and the solvent (which can comprise any combination of recovered solvent and/or makeup solvent) and any biocrude dissolved in the solvent to form an emulsion-solvent stream comprising a biocrude-solvent portion (which is also referred to herein as a "biocrude-solvent solution") and an aqueous-solids portion (which is also referred to herein as an "aqueous-solids mixture").

The second separator assembly 280 can be configured to receive the emulsion-solvent stream from the second mixing vessel 270. The second separator assembly 280 can be configured to separate or extract biocrude oil and solvent remaining in the emulsion-solvent stream from the aqueous phase and solids in the emulsion-solvent stream. The second separator assembly 280 can be configured to form the biocrude oil-solvent stream comprising the remaining biocrude oil and at least a portion of the solvent from the emulsion-solvent stream and can further be configured to provide the biocrude oil-solvent stream to the first mixing vessel 240. The second separator assembly 280 can be configured to form an aqueous-solids stream comprising the aqueous phase and the solids. Although the aqueous-solids stream ideally comprises as little remaining solvent as possible, some examples of the aqueous-solids stream can further comprise solvent entrained in the aqueous phase of the aqueous-solids stream.

In some examples, including a plurality of mixing vessels and separator assemblies in the HTL solvent extraction system 230 can further improve the system's ability to efficiently separate or extract biocrude oil from the emulsion. Although the illustrated HTL solvent extraction system 230 comprises two mixing vessels 240 and 270 and two separator assemblies 250 and 280, some examples of the HTL solvent extraction system 230 can comprise any number of mixing vessels and separator assemblies (for example, one, two, three, four, five, etc.). Furthermore, some examples of the HTL solvent extraction system 230 can comprise a first number of mixing vessels and a second, different number of separator assemblies.

The water product stripper apparatus 290 can be configured to receive the aqueous-solids stream from the second separator assembly 280. The water product stripper apparatus 290 can be configured to separate or extract solvent (e.g., entrained solvent) remaining from the aqueous-solids stream. In some examples, the remaining solvent can be more volatile than the aqueous phase in the aqueous-solids stream, so water product stripper apparatus 290 can vaporize and separate the remaining solvent from the aqueous phase and the solids. The water product stripper apparatus 290 can form a vaporized solvent stream exiting a top portion of the water product stripper apparatus 290 and a wastewater stream exiting a bottom portion of the water product stripper apparatus 290. The vaporized solvent stream can comprise solvent. In some examples, the vaporized solvent stream can further comprise naphtha and lighter hydrocarbons. The wastewater stream can comprise a mixture of the aqueous phase and the solids. The water product stripper apparatus 290 can be configured to provide the wastewater stream to a wastewater treatment plant 296 disposed downstream of the water product stripper apparatus 290.

In some examples, the water product stripper apparatus 290 (and/or any water product stripper apparatus disclosed herein) can comprise a fractional distillation tower.

In some examples, the water product stripper apparatus 290 can beneficially reduce demand on the makeup solvent source 272 by further recycling solvent entrained in the aqueous-solids stream exiting the second separator assembly 280, thereby reducing the solvent loss rate of the HTL solvent extraction system 230. In some examples, the water product stripper 290 can further reduce demand on the wastewater treatment plant 296 by further removing organic contaminants (e.g., solvent, light organics) in the wastewater stream.

In some examples, the aqueous phase, solvent, and solids can be heated to vaporize the solvent by injecting low pressure steam received from a steam source 297 into the water product stripper apparatus 290. The low-pressure steam can have a pressure from 300 kPa to 700 kPa, such as from 350 kPa to 650 kPa, 400 kPa to 600 kPa, 450 kPa to 550 kPa, from 500 kPa to 550 kPa, and/or from 510 kPa to 520 kPa.

In some examples, the water product stripper apparatus 290 can provide the vaporized solvent stream to a solvent recovery condenser 291 disposed downstream of the water product stripper apparatus 290. The solvent recovery condenser 291 can be configured to cool and/or condense the vaporized solvent, for example, to a liquid state. This can beneficially allow the recovered solvent to be stored in a knockout drum 292 disposed downstream of the solvent recovery condenser 291. Recovered solvent stored in the knockout drum 292 can be provided to the solvent stream and/or the second mixing vessel 270. In some examples, naphtha and/or light hydrocarbons can additionally be condensed by the solvent recovery condenser 291, stored in the knockout drum 292, and provided to the solvent stream and/or the second mixing vessel 270. In some examples, the naphtha and/or light hydrocarbons can exit the HTL solvent extraction system 230 through the biocrude oil stream sent to the biocrude product storage 294.

Any offgas that is not condensed by the solvent recovery condenser 291 can be vented to the offgas outlet 299 disposed downstream of the knockout drum 292.

Example 3: Third Representative HTL Solvent Extraction System

Figure 4:
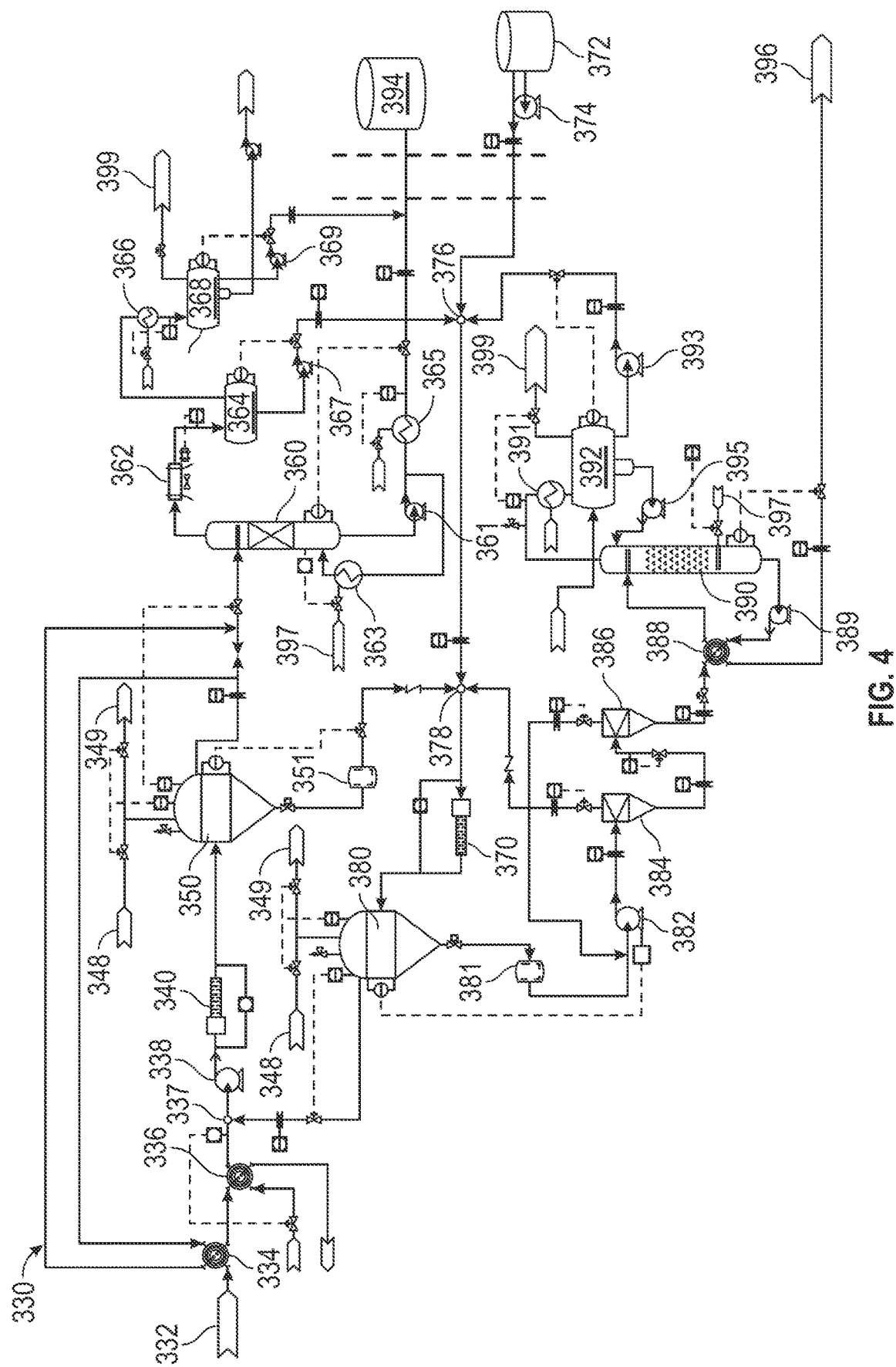
FIG. 4 is a schematic diagram of a HTL solvent extraction system, according to one example.

FIG. 4 is a schematic diagram of a HTL solvent extraction system 330, according to one example. The HTL solvent extraction system 330 can comprise an emulsion source 332, a first heat exchanger 334 disposed downstream of the emulsion source 332, a second heat exchanger 336 disposed downstream of the first heat exchanger 334, a first pump 338 disposed downstream of the second heat exchanger 336, a first mixing vessel 340 disposed downstream of the pump 338, a first separator assembly 350 disposed downstream of the first mixing vessel 340, a solvent recovery apparatus 360 disposed downstream of the first separator assembly 350 and upstream of a second mixing vessel 370, the second mixing vessel 370 disposed downstream of the first separator assembly 350 and the solvent recovery apparatus 360, a second separator assembly 380 disposed downstream of the second mixing vessel 370 and upstream of the first mixing vessel 340, first and second de-oiling cyclones 384 and 386 disposed downstream of the second separator assembly 380, a third heat exchanger 388 disposed downstream of the plurality of de-oiling cyclones 384 and 386, and a water product stripper apparatus 390 disposed downstream of the third heat exchanger 388.

The emulsion source 332 can be configured to provide an emulsion stream comprising an emulsion to the heat exchanger 334. In some examples, the emulsion source 332 can comprise a HTL reactor system (similar to HTL reactor system 120) that converts a biomass feed stream into the emulsion stream. In some examples, the biocrude can comprise 5% to 35% of the emulsion by mass, such as 10% to 30%, 15% to 25%, and/or 17.5% to 22.5%. In some examples, the solids comprise 1% to 20% of the emulsion by mass, such as 5% to 15%, and/or 7.5% to 12.5%. In some examples, the aqueous phase can comprise 40% to 95% of the emulsion by mass, such as 45% to 90%, 50% to 85%, 55% to 80%, 60% to 75%, and/or 65% to 70%. In some examples, the emulsion can further comprise any combination of carbon dioxide ($CO_2$), hydrogen sulfide ($H_2S$), ammonia ($NH_3$), and/or acetic acid. In some examples, the emulsion can have a $CO_2$ content from 300 ppm to 900 ppm, such as from 400 ppm to 800 ppm, from 500 ppm to 700 ppm, from 550 ppm to 650 ppm, and/or from 575 ppm to 625 ppm. In some examples, the emulsion can have a $H_2S$ content from 50 ppm to 450 ppm, such as from 100 ppm to 400 ppm, from 150 ppm to 350 ppm, from 200 ppm to 300 ppm, and/or from 225 ppm to 275 ppm. In some examples, the $NH_3$ can comprise 0.05% to 0.5% of the emulsion by mass, such as 0.1% to 0.3%, 0.15% to 0.25%, and/or 0.175% to 0.225%. In some examples, the acetic acid can comprise 0.2% to 2% of the emulsion by mass, such as 0.25% to 1.75%, 0.5% to 1.5%, and/or 0.75% to 1.25%. Some examples of the system shown in FIG. 4 can be sized and configured to handle an emulsion volumetric flow rate of approximately $2.2 \times 10^{-3}$ cubic meters per second and/or a mass flow rate of approximately 2.5 kilograms per second.

The first heat exchanger 334 can be configured to cool the emulsion stream received from the emulsion source 332. In some examples, the temperature of the incoming emulsion stream can be from 50° C. to 200° C., such as from 100° C. to 150° C., from 110° C. to 140° C., and/or from 120° C. to 130° C. In some examples, the pressure of the incoming emulsion stream can be from 100 kPa to 400 kPa, such as from 200 kPa to 300 kPa, from 225 kPa to 275 kPa, and/or from 260 kPa to 270 kPa. In some examples, the first heat exchanger 334 can cool the temperature of the emulsion stream to a first temperature from 20° C. to 150° C., such as from 40° C. to 150° C., from 65° C. to 125° C., from 90° C. to 100° C., and/or from 20° C. to 65° C.

The second heat exchanger 336 can be configured to cool the emulsion stream received from the first heat exchanger 334. In some examples, the pressure of the incoming emulsion stream from the first heat exchanger 336 can be from 100 kPa to 300 kPa, such as from 125 kPa to 275 kPa, from 150 kPa to 250 kPa, and/or from 175 kPa to 225 kPa. In some examples, the second heat exchanger 336 can cool the temperature of the emulsion stream to a second temperature from 20° C. to 125° C., such as from 20° C. to 100° C., from 20° C. to 80° C., from 20° C. to 65° C., from 20° C. to 60° C., from 40° C. to 80° C., from 30° C. to 70° C., from 25° C. to 50° C., from 30° C. to 45° C., and/or from 35° C. to 40° C.

In some examples, a temperature sensor can be disposed downstream of the second heat exchanger 336. The temperature sensor can control the flow rate of chilled water circulated through the second heat exchanger 336.

A first junction 337 can be disposed downstream of the second heat exchanger 336. The first junction 337 can be a junction of pipes at which a solvent stream provided by the second separator assembly 380 is introduced into the emulsion stream, thereby forming an emulsion-solvent stream. In some examples, the solvent and the emulsion in the emulsion-solvent stream can define a solvent-to-emulsion (S/E) weight ratio. In some examples, the S/E weight ratio can be from 0.1:1 to 6:1, such as from 1:1 to 5:1, from 3:1 to 4:1, from 0.2:1 to 0.8:1, from 0.3:1 to 0.7:1, and/or from 0.4:1 to 0.6:1. In some examples, a higher S/E weight ratio can facilitate the recovery of more biocrude oil from the emulsion. In some examples, a lower S/E weight ratio can reduce the amount of energy required to distill the solvent from the biocrude oil. In some examples, the solvent stream can comprise the solvent and biocrude oil dissolved in the solvent.

The first pump 338 can be disposed downstream of the first junction 337. The first pump 338 can be configured to pressurize the emulsion-solvent stream received from the first junction 337. In some examples, the first pump 338 can be configured to pressurize the emulsion-solvent stream to a pressure from 300 kPa to 700 kPa, such as from 400 kPa to 700 kPa, from 500 kPa to 600 kPa, from 525 kPa to 675 kPa, from 550 kPa to 650 kPa, from 575 kPa to 625 kPa, and/or from 585 kPa to 590 kPa.

The first mixing vessel 340 can be configured to receive an emulsion-solvent stream from the first pump 338. The first mixing vessel 340 can configured to further mix the emulsion and the solvent in the emulsion-solvent stream. In some examples, a differential pressure sensor can be disposed parallel to the first mixing vessel 340.

The first separator assembly 350 can be configured to receive an emulsion-solvent stream from the first mixing vessel 340 and can be further configured to separate the emulsion-solvent stream into a biocrude oil-solvent stream and an aqueous-solids stream. The biocrude-solvent stream can comprise a biocrude oil-solvent portion (which is also referred to herein as a "biocrude-solvent solution") comprising biocrude oil dissolved in solvent, while the aqueous-solids stream can comprise an aqueous-solids portion (which is also referred to herein as an "aqueous-solids mixture") comprising a mixture of the aqueous phase and the solids. In some examples, some biocrude oil and/or solvent can remain in the aqueous-solids stream after the first separator assembly 350 extracts the biocrude oil-solvent portion of the emulsion-solvent stream. For example, solvent can be entrained in the aqueous phase of the aqueous-solids stream and/or coated on particulate solids.

In some examples, the first separator assembly 350 can operate at a pressure from 300 kPa to 600 kPa, such as from 400 kPa to 500 kPa, from 420 kPa to 480 kPa, and/or from 440 kPa to 460 kPa. In some examples, the first separator assembly can operate at a temperature from 20° C. to 100° C., such as from 20° C. to 100° C., from 20° C. to 80° C., from 20° C. to 60° C., from 40° C. to 80° C., from 25° C. to 55° C., and/or from 35° C. to 45° C.

In some examples, the first separator assembly 350 can be coupled to a natural gas source 348 and a vent system 349.

In such examples, natural gas can be introduced from the natural gas source 348 into the first separator assembly 350 and/or vented from the first separator assembly 350 through the vent system 349 to maintain a selected operating pressure within the first separator assembly 350. In some examples, a pressure sensor, a level indicator, and/or other instrumentation can be coupled to the first separator assembly 350. The level indicator can be coupled to a valve disposed downstream of the first separator assembly 350 to control the flow of at least one of the biocrude-oil stream and the aqueous-solids stream.

A first strainer assembly 351 can be disposed downstream of the first separator assembly 350. The first strainer assembly 351 can be configured to filter at least a portion of the solids from the aqueous-solids stream exiting the first separator assembly 350. In some examples, the first strainer assembly 351 can be configured to filter solids to help prevent other components (e.g., static mixers 340 and 370) of the HTL solvent recovery system 330 from becoming plugged. In some examples, the solids can comprise precipitated biocrude components that are insoluble in the solvent. The first strainer assembly 351 (and/or any strainer disclosed herein) can be configured such that it can be cleaned without taking the process unit (e.g., the first strainer 351) offline. For example, the first strainer assembly 351 can comprise a plurality of strainers arranged in parallel.

In some examples, the biocrude oil-solvent stream exiting the first separator assembly 350 can circulate through the first heat exchanger 334. This configuration can beneficially allow heat to be transferred from the emulsion stream to the biocrude oil-solvent stream, thereby reducing the need to introduce additional energy into the system to heat the biocrude oil-solvent stream. In some examples, the biocrude oil-solvent stream can be heated to a temperature from 50° C. to 200° C., such as from 75° C. to 175° C., from 100° C. to 150° C., from 105° C. to 140° C., from 110° C. to 135° C., and/or from 120° C. to 125° C. In some examples, a flowmeter can be configured to measure the flow rate of the biocrude oil-solvent stream.

The solvent recovery apparatus 360 can be configured to receive the biocrude oil-solvent stream (e.g., after heating the biocrude oil-solvent stream in the heat exchanger 334). The solvent recovery apparatus 360 can be configured to separate the biocrude oil and solvent to extract the biocrude oil from the biocrude oil-solvent stream. In some examples, the solvent in the biocrude oil-solvent stream can be more volatile than the biocrude oil, so at least a portion of the solvent can be vaporized and thus separated from the biocrude oil when heated within the solvent recovery apparatus 360. In some examples, the biocrude oil and solvent can be heated within the solvent recovery apparatus 360 to a temperature from 50° C. to 200° C., such as from 75° C. to 175° C., from 100° C. to 150° C., from 115° C. to 150° C., from 120° C. to 145° C., and/or from 130° C. to 135° C. In some examples, the solvent recovery apparatus 360 can be operated under a mild vacuum, for example, at a pressure from 1 kPa to 100 kPa, such as from 10 kPa to 90 kPa, from 20 kPa to 80 kPa, from 30 kPa to 70 kPa, from 40 kPa to 60 kPa, and/or from 45 kPa to 50 kPa.

In some examples, the solvent recovery apparatus 360 can comprise a fractional distillation tower. At least a portion of the solvent can vaporize and exit a top portion of the fractional distillation tower. The un-vaporized biocrude oil, can exit a bottom portion of the fractional distillation tower. In some examples, a temperature sensor, a level indicator, and/or other instrumentation can be coupled to the solvent recovery apparatus 360. In some examples, the level indicator can be coupled to a valve disposed downstream of the solvent recovery apparatus 360 to control the follow of biocrude oil from the solvent recovery apparatus 360.

The solvent recovery apparatus 360 can form a biocrude oil stream from the separated biocrude oil. The biocrude oil stream can be received by a second pump 361 disposed downstream of the solvent recovery apparatus 360. The second pump 361 can be configured to propel the biocrude oil stream through a cooler 365 (e.g., a heat exchanger) disposed downstream of the second pump 361 and to a biocrude oil product storage 394 disposed downstream of the cooler 365. In some examples, a temperature sensor, a flowmeter, and/or other instrumentation can be configured to monitor the biocrude oil stream. In some examples, the temperature sensor disposed downstream of the cooler 365 can control the flow rate of chilled water circulated through the cooler 365.

In some examples, all or substantially all the solvent can be separated from the biocrude oil, such that the biocrude oil stream comprises, or consists substantially of, biocrude oil. In some examples, separating substantially all the solvent from the biocrude oil can beneficially minimize the amount of makeup solvent that must be added to the HTL solvent extraction system 330. In some examples, a portion of solvent is not separated from the biocrude oil, such that the biocrude oil stream comprises biocrude oil and a target concentration of solvent. In some examples, the target concentration of solvent can be from 0.1% to 10%, such as from 1% to 10%, from 3% to 6%, from 4% to 5%, from 5.5% to 8.5%, from 6% to 8%, and/or from 6.5% to 7.5%.

In some examples, a portion of the biocrude oil stream can be recirculated from the second pump 361 back to the solvent recovery apparatus 360 to introduce additional heat energy into the solvent recovery apparatus 360. In some examples, the recirculated portion of the biocrude oil stream can be heated by a solvent recovery reboiler 363 disposed downstream of the second pump 361 and upstream of the solvent recovery apparatus 360. The solvent recovery reboiler 363 can comprise a heat exchanger configured to transfer heat from a steam stream introduced by a steam source 397 to the recirculated portion of the biocrude oil stream. In some examples, a temperature sensor can be coupled to the solvent recovery apparatus 360 and can further be coupled to a valve disposed downstream of the steam source 397 to control the flow of steam into the solvent recovery reboiler 363.

The solvent separated from the biocrude oil by the solvent recovery apparatus 360 can be formed into a vaporized solvent stream. In some examples, the solvent recovery apparatus 360 can provide the vaporized solvent stream to a solvent recovery condenser 362 disposed downstream of the solvent recovery apparatus 360. The solvent recovery condenser 362 can be configured to cool and/or condense the vaporized solvent, for example, to a liquid state. In some examples, the solvent recovery condenser 362 can comprise a fin-fan heat exchanger.

The condensed solvent can be stored in a solvent recovery accumulation tank 364 disposed downstream of the solvent recovery condenser 362. In some examples, the condensed solvent can be stored at a temperature from 25° C. to 90° C., such as from 35° C. to 80° C., from 40° C. to 75° C., from 45° C. to 70° C., from 50° C. to 65° C., and/or from 55° C. to 60° C. In some examples, the condensed solvent can be stored at a pressure from 20 kPa to 100 kPa, such as from 20 kPa to 45 kPa, from 25 kPa to 40 kPa, and/or from 30 kPa to 35 kPa.

In some examples, the HTL solvent extraction system 330 can further comprise a vent gas condenser 366 disposed downstream of the solvent recovery accumulation tank 364, a vacuum knockout drum 368 disposed downstream disposed downstream of the vent gas condenser 366, and a third pump 369 disposed downstream of the vacuum knockout drum 368.

In some examples, a temperature sensor, a level indicator, and/or other instrumentation can be coupled to any of these components. In such examples, uncondensed vapors (which are also referred to herein as "vent gas") can be drawn from the solvent recovery accumulation tank 364 and condensed in the vent gas condenser 366. In some examples, the uncondensed vapors can comprise light hydrocarbons (e.g., acetone, ethanol, propanol) and offgas. The liquid condensate from the vent gas condenser 366 can comprise light hydrocarbons that can be stored in the vacuum knockout drum 368. The light hydrocarbons can be pumped through the third pump 369 and introduced into the biocrude oil stream. In some examples, removing the light hydrocarbons from the HTL solvent extraction system 330 (e.g., by combining the light hydrocarbons with the biocrude oil product exiting the HTL solvent extraction system 330) can beneficially help avoid "cycling up" in the solvent recycle stream. Any uncondensed vapors (e.g., the offgas) exiting the vent gas condenser 366 can be vented to an offgas outlet 399.

A fourth pump 367 can be disposed downstream of the solvent recovery accumulation tank 364. The fourth pump 367 can be configured to pump recovered solvent from the solvent recovery accumulation tank 364 to a second junction 376. The second junction 376 can comprise a junction of pipes at which recovered solvent and makeup solvent are combined to form a solvent stream. As shown, the second junction 376 can be configured to receive recovered solvent from additional sources, such as knockout drum 392 discussed later in this application. The makeup solvent can be provided by a makeup solvent source 372 disposed upstream of the second junction 376. A fifth pump 374 disposed upstream of the second junction 376 and downstream of the makeup solvent source 372 can be configured to pump makeup solvent from the makeup solvent source 372 to the second junction 376. In some examples, the pressure of the makeup solvent exiting the fifth pump 374 can range from 500 kPa to 800 kPa, such as from 600 kPa to 700 kPa, from 620 kPa to 690 kPa, from 630 kPa to 680 kPa, from 640 kPa to 670 kPa, and/or from 650 kPa to 660 kPa.

A third junction 378 can be disposed downstream of the second junction 376. The third junction can comprise a junction of pipes at which the solvent stream received from the second junction 376 is introduced into an aqueous-solids stream received from the first strainer assembly 351 to form an aqueous-solvent-solids stream. In some examples, a flowmeter can be disposed between the second junction 376 and the third junction 378.

The second mixing vessel 370 can be configured to receive the aqueous-solvent-solids stream from the third junction 378 and can be configured to further mix the stream. In some examples, a differential pressure sensor can be disposed in parallel with the second mixing vessel 370.

The second separator assembly 380 can be configured to receive an aqueous-solvent-solids stream from the second mixing vessel 370 and can be further configured to separate the aqueous-solvent-solids stream into a solvent stream and an aqueous-solids stream. The solvent stream can comprise solvent, while the aqueous-solids stream can comprise a mixture of the aqueous phase and the solids. In some examples, the solvent stream can further comprise biocrude oil. In some examples, some biocrude oil and/or solvent can remain in the aqueous-solids stream after the second separator assembly 380 extracts the solvent portion of the aqueous-solvent-solids stream. For example, solvent can be entrained in the aqueous phase of the aqueous-solids stream.

In some examples, the second separator assembly 380 can operate at a pressure from 100 kPa to 300 kPa, such as from 150 kPa to 250 kPa, from 175 kPa to 225 kPa, from 200 kPa to 225 kPa and/or from 200 kPa to 210 kPa. In some examples, the second separator assembly 380 can operate at a temperature 20° C. to 100° C., such as from 20° C. to 80° C., from 40° C. to 80° C., from 25° C. to 65° C., from 35° C. to 60° C., from 40° C. to 55° C., and/or from 45° C. to 50° C.

In some examples, the second separator assembly 380 can be coupled to the natural gas source 348 and the vent system 349. In such examples, natural gas can be introduced from the natural gas source 348 into the second separator assembly 380 and/or vented from the second separator assembly 380 through the vent system 349 to maintain a desired operating pressure within the first separator assembly 350. In some examples, a pressure sensor, a level indicator, and/or other instrumentation can be coupled to the second separator assembly 380. The level indicator can be coupled to a valve disposed downstream of the second separator assembly 380 to control the flow of at least one of the biocrude-oil stream and the aqueous-solids stream.

A second strainer assembly 381 can be disposed downstream of the second separator assembly 380. The second strainer assembly 381 can be configured to filter at least a portion of the solids from the aqueous-solids stream exiting the second separator assembly 380. In some examples, the second strainer assembly 381 can be configured to filter solids comprising precipitated biocrude components that are insoluble in the solvent and/or particles that can plug other components (e.g., static mixers 340 and 370) of the HTL solvent recovery system 330.

A sixth pump 382 can be disposed downstream of the second strainer assembly 381. The sixth pump 382 can be configured to pressure an aqueous-solids stream received from the second strainer 381 to a pressure from 500 kPa to 700 kPa, such as from 550 kPa to 650 kPa, from 550 kPa to 600 kPa, from 570 kPa to 600 kPa, and/or from 580 kPa to 590 kPa. In some examples, a variable flow drive ("VFD") can be coupled to the sixth pump 382.

The first de-oiling cyclone 384 (which is also referred to herein as a "hydrocyclone") can be disposed downstream of the sixth pump 382. The first de-oiling cyclone 384 can be configured to separate and recover solvent (e.g., solvent droplets entrained in the aqueous phase) from an aqueous-solids stream received from the sixth pump 382. Solvent extracted or recovered by the first de-oiling cyclone 384 can be provided to the third junction 378 and combined with the aqueous-solids stream received from the first strainer 351 and the solvent stream received from the second junction 376. In some examples, the pressure drop across the first de-oiling cyclone 384 (and/or any de-oiling cyclone disclosed herein) can be in a range from 100 kPa to 200 kPa, such as from 125 kPa to 175 kPa, from 125 kPa to 150 kPa, and/or from 135 kPa to 140 kPa. In some examples, flowmeters or other instrumentation can be configured to measure the flow of the aqueous-solids stream entering the first de-oiling cyclone 384 and/or the flow of extracted solvent to the third junction 378.

The second de-oiling cyclone 386 can be disposed downstream of the first de-oiling cyclone 384. The first de-oiling cyclone 384 can be configured to separate and recover solvent (e.g., solvent droplets entrained in the aqueous phase) from an aqueous-solids stream received from the first de-oiling cyclone 384. Solvent extracted or recovered by the second de-oiling cyclone 386 can be introduced into the aqueous-solids stream at a location upstream of the sixth pump 382 and downstream of the second strainer 381. In some examples, flowmeters or other instrumentation can be configured to measure the flow of the aqueous-solids stream entering the second de-oiling cyclone 386 and/or the flow of extracted solvent.

Although the illustrated HTL solvent extraction system 330 comprises two de-oiling cyclones 384 and 386, some examples of the HTL solvent extraction system 330 can comprise any number of de-oiling cyclones (such as one, two, three, four, five, etc.).

The third heat exchanger 388 can be disposed downstream of the plurality of de-oiling cyclones 384 and 386. The third heat exchanger can be configured to heat an aqueous-solids stream received from the second de-oiling cyclone 386 to a temperature from 50° C. to 150° C., such as from 70° C. to 140° C., from 80° C. to 130° C., from 90° C. to 120° C., and/or from 100° C. to 110° C.

The water product stripper apparatus 390 can be disposed downstream of the third heat exchanger 388. The water product stripper apparatus 390 can be configured to receive an aqueous-solids stream from the third heat exchanger 388. The water product stripper apparatus 390 can be configured to separate or extract the remaining solvent entrained in the aqueous-solids stream. In some examples, the remaining solvent can be more volatile than the aqueous phase in the aqueous-solids stream, so water product stripper apparatus 390 can vaporize and separate the remaining solvent from the aqueous phase. In some examples, the water product stripper apparatus 390 can operate at a pressure from 100 kPa to 300 kPa, such as from 150 kPa to 250 kPa, from 175 kPa to 225 kPa, from 200 kPa to 225 kPa and/or from 200 kPa to 210 kPa.

The water product stripper apparatus 390 can form a vaporized solvent stream exiting a top portion of the water product stripper apparatus 390 and a wastewater stream exiting a bottom portion of the water product stripper apparatus 390. In some examples, the vaporized solvent stream can have a temperature from 50° C. to 200° C., such as from 100° C. to 150° C., from 110° C. to 140° C., and/or from 120° C. to 130° C. The vaporized solvent stream can comprise solvent. In some examples, the vaporized solvent stream can further comprise naphtha and lighter hydrocarbons. The wastewater stream can comprise a mixture of the aqueous phase and the solids. The water product stripper apparatus 390 can be configured to provide the wastewater stream to a wastewater treatment plant 396 disposed downstream of the water product stripper apparatus 390.

In some examples, the wastewater stream can be pumped by a seventh pump 389 disposed downstream of the water product stripper apparatus 390 and through the third heat exchanger 388 disposed downstream of the seventh pump 389. In such examples, the temperature of the wastewater stream entering the third heat exchanger 388 can range from 50° C. to 200° C., such as from 100° C. to 150° C., from 110° C. to 140° C., and/or from 120° C. to 130° C. The temperature of the wastewater stream exiting the third heat exchanger 388 can range from 50° C. to 150° C., such as from 60° C. to 130° C., from 70° C. to 120° C., from 80° C. to 110° C., and/or from 90° C. to 100. The pressure of the wastewater stream exiting the third heat exchanger 388 can range from 400 kPa to 600 kPa, such as from 450 kPa to 550 kPa, from 500 kPa to 530 kPa, and/or from 510 kPa to 520 kPa. This configuration can beneficially allow heat to be transferred from the wastewater stream to the aqueous-solids stream entering the third heat exchanger 388, beneficially reducing the energy requirements of the HTL solvent recovery system 330.

In some examples, a level indicator or other instrumentation can be coupled to the water product stripper apparatus 390.

In some examples, the aqueous phase, solvent, and solids disposed within the water product stripper apparatus 390 can be heated to vaporize the solvent by injecting low pressure steam received from the steam source 397 into the water product stripper apparatus 390.

In some examples, the water product stripper apparatus 390 can provide the vaporized solvent stream to a solvent recovery condenser 391 disposed downstream of the water product stripper apparatus 390. The solvent recovery condenser 391 can be configured to cool and/or condense the vaporized solvent, for example, to a liquid state. This can beneficially allow the recovered solvent to be stored in a knockout drum 392 disposed downstream of the solvent recovery condenser 391. Recovered solvent stored in the knockout drum 392 can be pumped by an eighth pump 393 to the second junction 376, where the recovered solvent can be combined with the recovered solvent from the solvent recovery accumulation tank 364 and the makeup solvent from the makeup solvent source 372. In some examples, naphtha and/or light hydrocarbons can additionally be condensed by the solvent recovery condenser 391, stored in the knockout drum 392, and supplied to the solvent stream and/or the second mixing vessel 370.

The temperature of the solvent supplied to the solvent stream and/or the second mixing vessel 370 can range from 50° C. to 150° C., such as from 60° C. to 130° C., from 70° C. to 120° C., from 80° C. to 110° C., and/or from 90° C. to 100° C. The pressure of the solvent supplied to the solvent stream and/or the second mixing vessel 370 can range from 400 kPa to 600 kPa, such as from 450 kPa to 550 kPa, from 500 kPa to 530 kPa, and/or from 510 kPa to 520 kPa.

In some examples, sour water from the HTL reactor system (for example, a low-pressure flash drum of the HTL reactor system) can be piped into the knockout drum 392. The sour water can comprise any combination of water, light naphtha, heavy naphtha, and diesel. In some examples, the water can comprise 90% to 95% of the sour water by mass, such as 92% to 94%.

In some examples, the light naphtha can comprise 3% to 7% of the sour water by mass, such as 4% to 6%. In some examples, the heavy naphtha can comprise 1% to 5% of the sour water by mass, such as 1% to 3%. In some examples, the diesel can comprise 0.5% to 1.5% of the sour water by mass.

Any offgas that is not condensed by the solvent recovery condenser 391 can be vented to the offgas outlet 399 disposed downstream of the knockout drum 392. In some examples, the offgas can comprise any combination of $NH_3$, $H_2S$, $CO_2$, light naphtha, and an acetone-ethanol mixture. In some examples, the $NH_3$ can comprise 20% to 40% of the offgas by mass, such as 25% to 35%. In some examples, the $H_2S$ can comprise 1% to 3% of the offgas by mass. In some examples, the $CO_2$ can comprise 15% to 30% of the offgas by mass, such as 20% to 25%. In some examples, the light naphtha can comprise 30% to 50% of the offgas by mass, such as 35% to 45%. In some examples, the acetone-ethanol mixture can comprise 1% to 10% of the offgas by mass, such as 5% to 7%.

In some examples, water collected in the knockout drum 392 can be refluxed back into the water product stripper apparatus 390 via a ninth pump 395 disposed downstream of the knockout drum 392 and upstream of the water product stripper product apparatus 390.

Example 4: Fourth Representative HTL Solvent Extraction System

Figure 5:
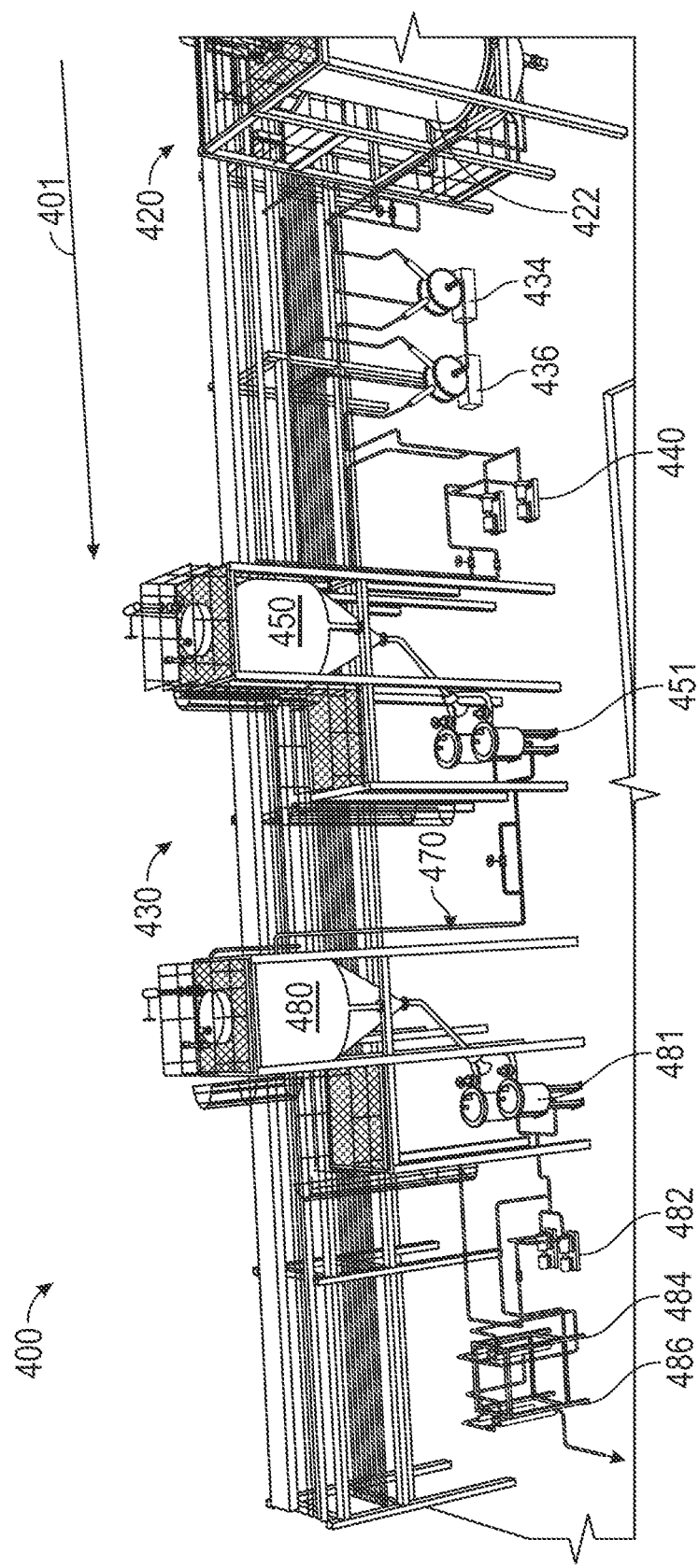
FIG. 5 is a perspective view of a biocrude oil production system using HTL, according to one example.

FIG. 5 is a perspective view of a biocrude oil production system 400 using HTL, according to one example. The biocrude oil production system 400 can comprise a HTL reactor system generally indicated at 420 and a HTL solvent extraction system generally indicated at 430 disposed downstream of the HTL reactor system 420.

The HTL reactor system 420 can comprise a HTL reactor and a low pressure flash drum 422 disposed downstream of the HTL reactor. Arrow 401 indicates the general direction of the flow of emulsion through the biocrude oil production system 400. The low pressure flash drum 422 (which is also referred to herein as a "low pressure vapor-liquid disengagement vessel") can be configured to separate vaporized water and other gaseous byproducts from an emulsion stream exiting the HTL reactor. In some examples, separating vaporized water from the emulsion stream exiting the HTL reactor can beneficially decrease the aqueous phase content of the emulsion entering the HTL solvent extraction system 430 and/or reduce the energy requirements of the HTL reactor system 420, for example, by using the vaporized water and gaseous byproducts to heat a biomass feed stream entering the HTL reactor system 420.

Similar to the previously disclosed HTL solvent extraction systems, the HTL solvent extraction system 430 can comprise a first heat exchanger 434, a second heat exchanger 436 disposed downstream of the first heat exchanger 434, a first mixing assembly 440 disposed downstream of the second heat exchanger 436, a first separator assembly 450 disposed downstream of the first mixing assembly 440, a first strainer assembly 451 disposed downstream of the first separator assembly 450, a second mixing assembly 470 disposed downstream of the first strainer assembly 451, a second separator assembly 480 disposed downstream of the second mixing assembly 470, a second strainer assembly 481 disposed downstream of the second separator assembly 480, a pump assembly 482 disposed downstream of the second strainer assembly 481, a first de-oiling cyclone 484 disposed downstream of the pump assembly 482, and a second de-oiling cyclone 486 disposed downstream of the first de-oiling cyclone 484.

In some examples, the first heat exchanger 434 can be disposed downstream of the low pressure flash drum 422. The first heat exchanger 434 can be configured to receive an emulsion stream from the low pressure flash drum 422.

In some examples, the first mixing assembly 440 can comprise a dynamic mixer. As shown, the dynamic mixer can comprise a plurality (e.g., two) emulsion pumps. As shown, the second mixing assembly 470 can comprise a static mixer. However, the first mixing assembly 440 and the second mixing assembly 470 can comprise any combination of types of static and/or dynamic mixers.

In some examples, any one of the first separator assembly 450 and the second separator assembly 480 can be elevated relative to the first and second mixing assemblies 440 and 470 and/or the first and second strainer assemblies 451 and 481. In some examples, elevating the separator assemblies 450 and 480 can help prevent solids from accumulating in the piping leading to the strainers and can thus help improve the reliability of the HTL solvent extraction system 430.

As shown, each of the first strainer assembly 451 and the second strainer assembly 481 comprise two strainers arranged in parallel. As such, the first strainer assembly 451 and the second strainer assembly 481 can each be configured to be cleaned without being taken offline.

It should be understood that any component in any of the disclosed HTL solvent extraction systems can also comprise one or a plurality of corresponding backup components arranged in parallel such that, similar to the strainer assemblies 451 and 481, any component can be cleaned, maintained, or repaired without taking the system offline.

Example 5: Representative Naphtha Reformer

Figure 6:
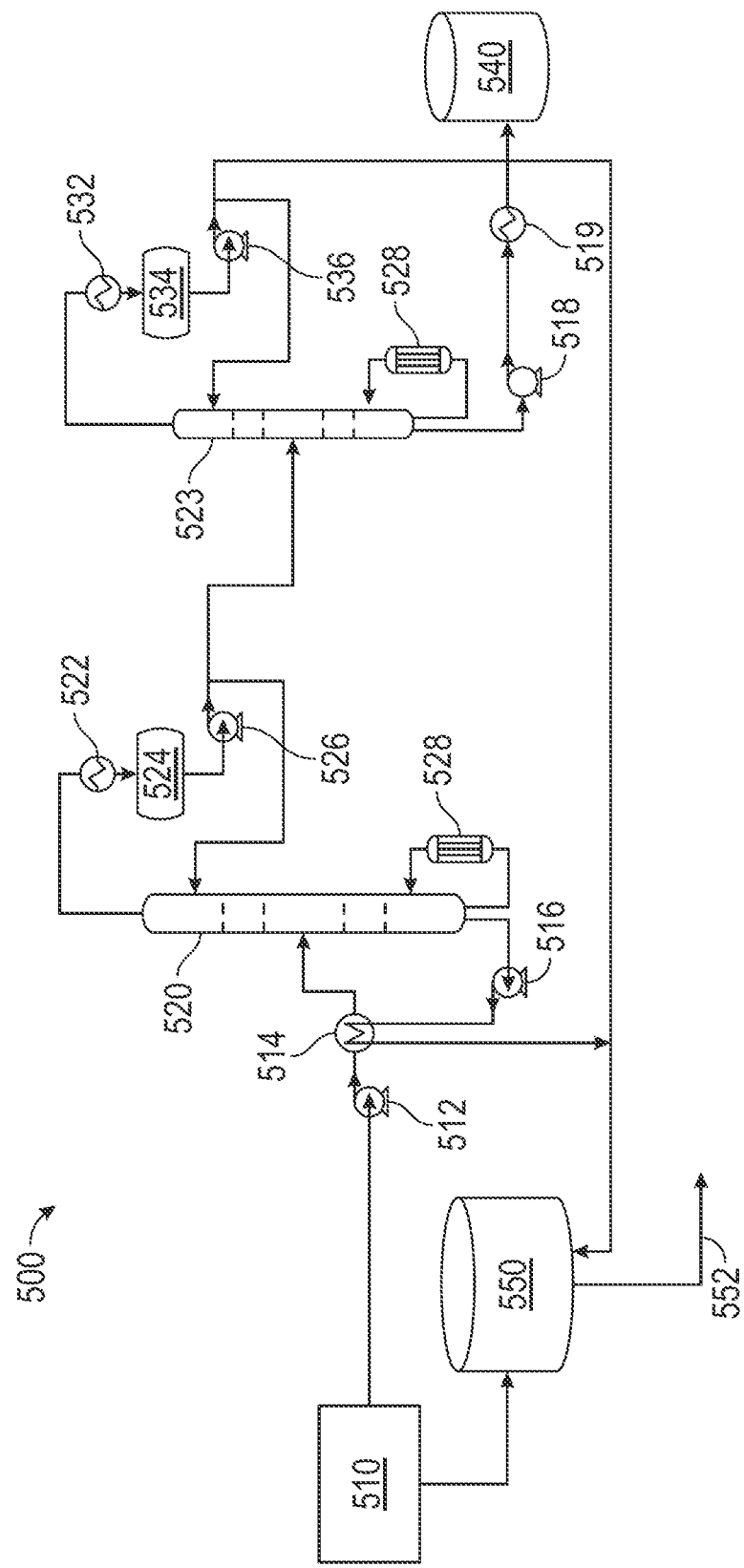
FIG. 6 is a schematic diagram of a reformer, according to one example.

FIG. 6 is a schematic diagram of a solvent production system 500, according to one example. The solvent production system 500 can be configured to produce a solvent from a naphtha reformate (which is also referred to herein as a "reformate"), wherein the solvent can be used with any of the disclosed HTL solvent extraction systems and/or processes disclosed herein.

The solvent production system 500 can comprise a naphtha reformer 510, a heavy reformate tower 520 disposed downstream of the naphtha reformer 510, a light reformate tower 523 disposed downstream of the heavy reformate tower 520, a solvent storage 540 disposed downstream of the light reformate tower 523, and a reformate storage 550 disposed downstream of each of the naphtha reformer 510, the heavy reformate tower 520, and the light reformate tower 523.

The naphtha reformer 510 (which is also referred to herein as a "reformer" and/or a "catalytic reformer") can be a portion of an oil refinery configured to convert naphtha-range molecules distilled from crude oil and/or biocrude oil into high-octane reformates.

In some examples, the naphtha-range molecules can comprise hydrocarbons ranging from $C_5$ to $C_{12}$, sulfur, and nitrogen. In some examples, the naphtha-range molecules can have a boiling range between 30° C. and 230° C. In some examples, the naphtha-range molecules can comprise any combination of light naphtha molecules, medium naphtha molecules, and heavy naphtha molecules. The light naphtha molecules can comprise $C_5$ and $C_6$ hydrocarbons with boiling points between 30° C. and 90° C. The medium naphtha molecules can comprise $C_7$ to $C_9$ hydrocarbons with a boiling range at or below 150° C. (e.g., between 90° C. and 150° C.). The heavy naphtha molecules can comprise $C_9$ to $C_{12}$ hydrocarbons with boiling points between 90° C. and 200° C. More specifically, the naphtha reformer 510 can be configured to increase the octane of the naphtha-range molecules by increasing branching through isomerization reactions and converting the naphtha-range molecules into aromatic hydrocarbons (which are also referred to herein as "aromatics" (e.g., unsaturated, cyclic hydrocarbons having alternate single and double bonds, such as toluene, xylene, and benzene, etc.)). The naphtha reformer 510 can be configured to provide a reformate stream comprising the reformate.

Table 1 lists a composition of a reformate that can be produced by the naphtha reformer 510, according to one example. In some examples, the reformate can be used as a solvent in any HTL solvent extraction system or process disclosed herein. In some examples, the reformate can be processed into a solvent. The example reformate can comprise approximately 79% aromatics by mass. The specific gravity of the reformate can be approximately 0.84. In some examples, the reformate can comprise approximately 29% $C_9+$ components by mass. In some of these examples, the $C_9+$ components can exit the HTL solvent extraction system with the biocrude oil product and can be processed by the refinery into fuel components.

TABLE 1

Example Reformate Composition

| C# | Paraffins | Isoparaffins | Olefins | Naphthenes | Aromatics | Total |
|---|---|---|---|---|---|---|
| 4 | 0.21 | 0.02 | 0.00 | 0.00 | 0.00 | 0.22 |
| 5 | 0.37 | 0.42 | 0.07 | 0.13 | 0.00 | 0.99 |
| 6 | 0.68 | 0.50 | 0.06 | 0.06 | 0.32 | 1.63 |
| 7 | 3.28 | 7.89 | 0.33 | 1.19 | 18.03 | 30.73 |
| 8 | 0.44 | 2.22 | 0.00 | 1.09 | 32.99 | 36.74 |
| 9 | 0.13 | 0.66 | 0.00 | 0.57 | 18.85 | 20.21 |
| 10 | 0.04 | 0.19 | 0.00 | 0.16 | 4.37 | 4.76 |
| 11 | 0.01 | 0.05 | 0.00 | 0.06 | 3.66 | 3.79 |
| 12 | 0.00 | 0.00 | 0.00 | 0.00 | 0.59 | 0.59 |
| 13 | 0.00 | 0.00 | 0.00 | 0.00 | 0.20 | 0.20 |
| 14 | 0.00 | 0.00 | 0.00 | 0.00 | 0.14 | 0.14 |
| Total | 5.15 | 11.95 | 0.46 | 3.27 | 79.16 | 100.00 |

A first pump 512 can be disposed downstream of the naphtha reformer 510. The first pump 512 can be configured to receive the reformate stream and pressurize it to a pressure ranging from 200 kPa to 400 kPa, such as from 250 kPa to 350 kPa, from 275 kPa to 325 kPa, and/or from 300 kPa to 320 kPa.

A first heat exchanger 514 can be disposed downstream of the first pump 512. The first heat exchanger 514 can be configured to heat the reformate stream to a temperature ranging from 50° C. to 150° C., such as from 70° C. to 130° C., from 90° C. to 110° C., and/or from 100° C. to 110° C.

The heavy reformate tower 520 can be disposed downstream of the first heat exchanger 514. The heavy reformate tower 520 can be configured to separate the reformate stream into a heavy return reformate stream and a light reformate stream. The heavy return reformate stream can comprise naphtha molecules (e.g., C9+ components) that are too heavy (e.g., insufficiently volatile) to be included in the solvent. The heavy return reformate stream can be provided to the reformate storage 550 disposed downstream of the heavy reformate tower 520.

In some examples, the heavy reformate tower 520 can be configured to operate at a temperature ranging from 100° C. to 200° C., such as from 130° C. to 180° C., from 140° C. to 170° C., and/or from 150° C. to 160° C. In some examples, the contents of the heavy reformate tower 520 can be circulated through a shell-and-tube heat exchanger 528 coupled to the heavy reformate tower 520.

In some examples, the heavy return reformate stream can be circulated by a second pump 516 through the first heat exchanger 514 to heat the reformate stream before being received by the reformate storage 550 disposed downstream of the first heat exchanger 514. In some examples, the heavy return reformate stream can exit the first heat exchanger 514 at a temperature ranging from 25° C. to 100° C., such as from 30° C. to 90° C., from 40° C. to 80° C., and/or from 50° C. to 70° C.

A first condenser 522 can be disposed downstream of the heavy reformate tower 520. The first condenser 522 can be configured to receive the light reformate stream from the heavy reformate tower 520 and cool the light reformate stream. In some examples, the first condenser 522 can be configured to cool the light reformate stream to a temperature ranging 50° C. to 150° C., such as from 60° C. to 110° C., from 70° C. to 100° C. and/or from 80° C. to 90° C.

A first accumulation tank 524 can be disposed downstream of the first condenser 522 and can be configured to store the condensed light reformate stream.

A third pump 526 can be disposed downstream of the first accumulation tank 524. The third pump 526 can be configured to receive a light reformate stream from the first accumulation tank 524 and pump the light reformate stream to the light reformate tower 523. In some examples, the third pump 526 can recirculate a portion of the light reformate stream to the heavy reformate tower 520.

The light reformate tower 523 can be configured to separate the light reformate stream into a solvent stream and a return reformate stream. The return reformate stream can comprise naphtha molecules that are too light (e.g., too volatile) to be included in the solvent. The return reformate stream can be provided to the reformate storage 550 disposed downstream of the light reformate tower 523.

In some examples, the light reformate tower 523 can be configured to operate at a temperature ranging from 50° C. to 150° C., such as from 90° C. to 150° C., from 100° C. to 140° C., and/or from 110° C. to 130° C. In some examples, the contents of the light reformate tower 523 can be circulated through a shell-and-tube heat exchanger 528 coupled to the light reformate tower 523.

A second condenser 532 can be disposed downstream of the light reformate tower 523. The second condenser 532 can be configured to receive the return reformate stream from the light reformate tower 523 and cool the return reformate stream. In some examples, the second condenser 532 can be configured to cool the return reformate stream to a temperature ranging 25° C. to 125° C., such as from 50° C. to 100° C., from 60° C. to 90° C. and/or from 70° C. to 80° C.

A second accumulation tank 534 can be disposed downstream of the second condenser 532 and can be configured to store the condensed light reformate stream.

A fourth pump 536 can be disposed downstream of the second accumulation tank 534. The fourth pump 536 can be configured to receive a light return reformate stream (e.g., comprising light reformate distilled in the tower 523) from the second accumulation tank 534 and pump the light return reformate stream to the reformate storage 550 at a pressure ranging from 200 kPa to 400 kPa, such as from 250 kPa to 350 kPa, from 275 kPa to 325 kPa, and/or from 300 kPa to 320 kPa. In some examples, the fourth pump 536 can recirculate a portion of the light reformate stream to the light reformate tower 523.

The reformate storage 550 can be configured to receive the heavy return reformate stream and the light return reformate stream. The reformate storage 550 can be configured to provide a gasoline blending stream 552. The gasoline blending stream 552 can comprise a mixture of the heavy return reformate stream and the light return reformate stream and can be configured to be blended with gasoline in another portion of an oil refinery to increase the gasoline's octane content.

Table 2 lists a composition of the gasoline blending stream 552, according to one example. In some examples, the composition of the gasoline blending stream 552 can be similar to the composition of the reformate stream produced by the naphtha reformer 510 because, in some examples, only 0.5% to 2.5% of the reformate produced by the naphtha reformer 510 is required to produce a sufficient amount of solvent. Thus, in such examples, only a small amount of reformate can be converted into solvent, which can beneficially minimize the impact of solvent production on other refining operations (e.g., fuel production such as gasoline production).

TABLE 2

Example Gasoline Blending Stream Composition

| C# | Paraffins | Isoparaffins | Olefins | Naphthenes | Aromatics | Total |
|---|---|---|---|---|---|---|
| 4 | 0.21 | 0.02 | 0.00 | 0.00 | 0.00 | 0.22 |
| 5 | 0.37 | 0.42 | 0.07 | 0.13 | 0.00 | 0.99 |
| 6 | 0.68 | 0.50 | 0.06 | 0.06 | 0.33 | 1.63 |
| 7 | 3.28 | 7.90 | 0.33 | 1.19 | 17.98 | 30.68 |
| 8 | 0.44 | 2.21 | 0.00 | 1.09 | 33.03 | 36.77 |
| 9 | 0.13 | 0.66 | 0.00 | 0.57 | 18.87 | 20.22 |
| 10 | 0.04 | 0.19 | 0.00 | 0.16 | 4.38 | 4.77 |
| 11 | 0.01 | 0.05 | 0.00 | 0.06 | 3.66 | 3.79 |
| 12 | 0.00 | 0.00 | 0.00 | 0.00 | 0.59 | 0.59 |
| 13 | 0.00 | 0.00 | 0.00 | 0.00 | 0.20 | 0.20 |
| 14 | 0.00 | 0.00 | 0.00 | 0.00 | 0.14 | 0.14 |
| Total | 5.15 | 11.95 | 0.46 | 3.27 | 79.16 | 100.00 |

A fifth pump 518 can be disposed downstream of the light reformate tower 523 and can be configured to pressurize the solvent stream received from the light reformate tower 523 to a pressure ranging from 250 kPa to 5000 kPa, such as from 300 kPa to 450 kPa, from 350 kPa to 400 kPa, and/or from 370 kPa to 390 kPa.

A third condenser 519 can be disposed downstream of the fifth pump 518 and can be configured to cool a solvent stream received from the fifth pump 518 to a temperature ranging 20° C. to 100° C., such as from 30° C. to 90° C., from 40° C. to 80° C. and/or from 50° C. to 70° C.

The solvent storage 540 can be configured to receive a solvent stream from the third condenser 519. Table 3 lists a composition of the solvent stream, according to one example.

The exemplary solvent can be used with any of the disclosed HTL solvent extraction systems and/or processes disclosed herein. However, it should be understood that solvents with other compositions can be used with any of the disclosed HTL solvent extraction systems and/or processes disclosed herein.

TABLE 3

Example Solvent Composition

| C# | Paraffins | Isoparaffins | Olefins | Naphthenes | Aromatics | Total |
|---|---|---|---|---|---|---|
| 4 | 0.00 | 0.00 | 0.00 | 0.00 | 0.00 | 0.00 |
| 5 | 0.00 | 0.00 | 0.00 | 0.00 | 0.00 | 0.00 |
| 6 | 0.00 | 0.00 | 0.00 | 0.00 | 0.00 | 0.00 |
| 7 | 7.36 | 3.97 | 1.00 | 1.44 | 75.00 | 88.77 |
| 8 | 0.32 | 7.96 | 0.00 | 1.27 | 0.40 | 9.96 |
| 9 | 0.00 | 1.27 | 0.00 | 0.00 | 0.00 | 1.27 |
| 10 | 0.00 | 0.00 | 0.00 | 0.00 | 0.00 | 0.00 |
| 11 | 0.00 | 0.00 | 0.00 | 0.00 | 0.00 | 0.00 |
| 12 | 0.00 | 0.00 | 0.00 | 0.00 | 0.00 | 0.00 |
| 13 | 0.00 | 0.00 | 0.00 | 0.00 | 0.00 | 0.00 |
| 14 | 0.00 | 0.00 | 0.00 | 0.00 | 0.00 | 0.00 |
| Total | 7.67 | 13.20 | 1.00 | 2.71 | 75.40 | 100.00 |

In some examples, the solvent produced by the solvent production system 500 can have an aromatics concentration from 50% to 95%, such as from 60% to 90%, from 60% to 80%, from 70% to 80%, from 72% to 78%, and/or from 75% to 80%. In such examples, solvents with an aromatic concentration of at least 50% can better dissolve biocrude oil than solvents with lesser aromatic concentrations. In some examples, the solvent can have a boiling point in a range from 20° C. to 200° C., such as from 100° C. to 175° C., from 25° C. to 100° C., and/or from 35° C. to 95° C. In such examples, solvents with a boiling point lower than 175° C. (e.g., lighter and/or more volatile than gasoline) can be more volatile than biocrude oil and thus facilitate the separation of biocrude oil and solvent in a solvent recovery apparatus. In some examples, the solvent can have a specific gravity in a range from 0.5 to 0.9, such as from 0.6 to 0.9, from 0.7 to 0.9, from 0.8 to 0.9, from 0.5 to 0.8, from 0.5 to 0.7, and/or from 0.5 to 0.6. In such examples, solvents with specific gravities less than 0.9 can facilitate the gravity separation of solvent (and dissolved biocrude oil) from an aqueous phase (e.g., water) in a water product stripper apparatus.

The solvent can comprise any of a variety of liquid hydrocarbons. For example, the solvent can comprise any of a variety of crude oil distillates. In particular examples, the solvent can comprise naphtha and/or naphtha-range molecules (e.g., hydrocarbon molecules having a carbon number of $C_5$ to $C_{12}$), such as reformate and/or gasoline (e.g., ethanol-free cetane gasoline). Examples include, without limitation, aromatic bulk chemicals such as toluenes, styrenes, benzenes, xylenes, ethyl-benzene, trimethyl benzenes, alkane hydrocarbons such as paraffins and isoparaffins including decane (e.g., n-decane) and heptane, alkene hydrocarbons such as olefins, naphthenes and/or cycloalkanes, and/or other hydrocarbon liquids such as ethyl acetate, methylcyclohexane, or any combination of the hydrocarbons above including the reformate, gasoline, and solvent compositions in Tables 1-3. In some examples, the solvent can comprise any formulation of reformate produced by a naphtha reformer, such as the reformer 510, and/or the return reformate. In some examples, ethyl acetate, toluene, and/or heptane can be especially suitable ingredients for solvents since these chemicals can substantially and/or completely dissolve biocrude oil.

In certain examples, the biocrude oil can be completely dissolvable in solvent such that all or substantially all the biocrude oil (e.g., 80% to 100%, such as 90% to 100% and/or 95% to 100%) is in a biocrude-solvent solution. In some examples, only a portion of the biocrude oil can be dissolved in solvent. In some examples, the amount or proportion of biocrude oil dissolved in solvent can vary based on biocrude oil composition, feedstock composition, and/or process conditions. In some examples, the solubility of the biocrude oil in the solvent can range from 50% to 100%, such as from 60% to 100%, from 70% to 100%, from 80% to 100%, from 90% to 100%, from 90% to 95%, and/or from 95% to 100%.

In some of these examples, the solvent can comprise 60% to 90% toluene by mass, such as 65% to 85% toluene, 70% to 80% toluene, and/or 72.5% to 77.5% toluene. In some examples, the solvent can comprise 5% to 35% heptane, such as 10% to 30% heptane, 15% to 25% heptane, and/or 17.5% to 22.5% heptane. In some examples, the solvent can comprise 80% toluene by mass and 20% heptane by mass (or by volume).

Example 6: Representative Biocrude Oil Production Process

Figure 7:
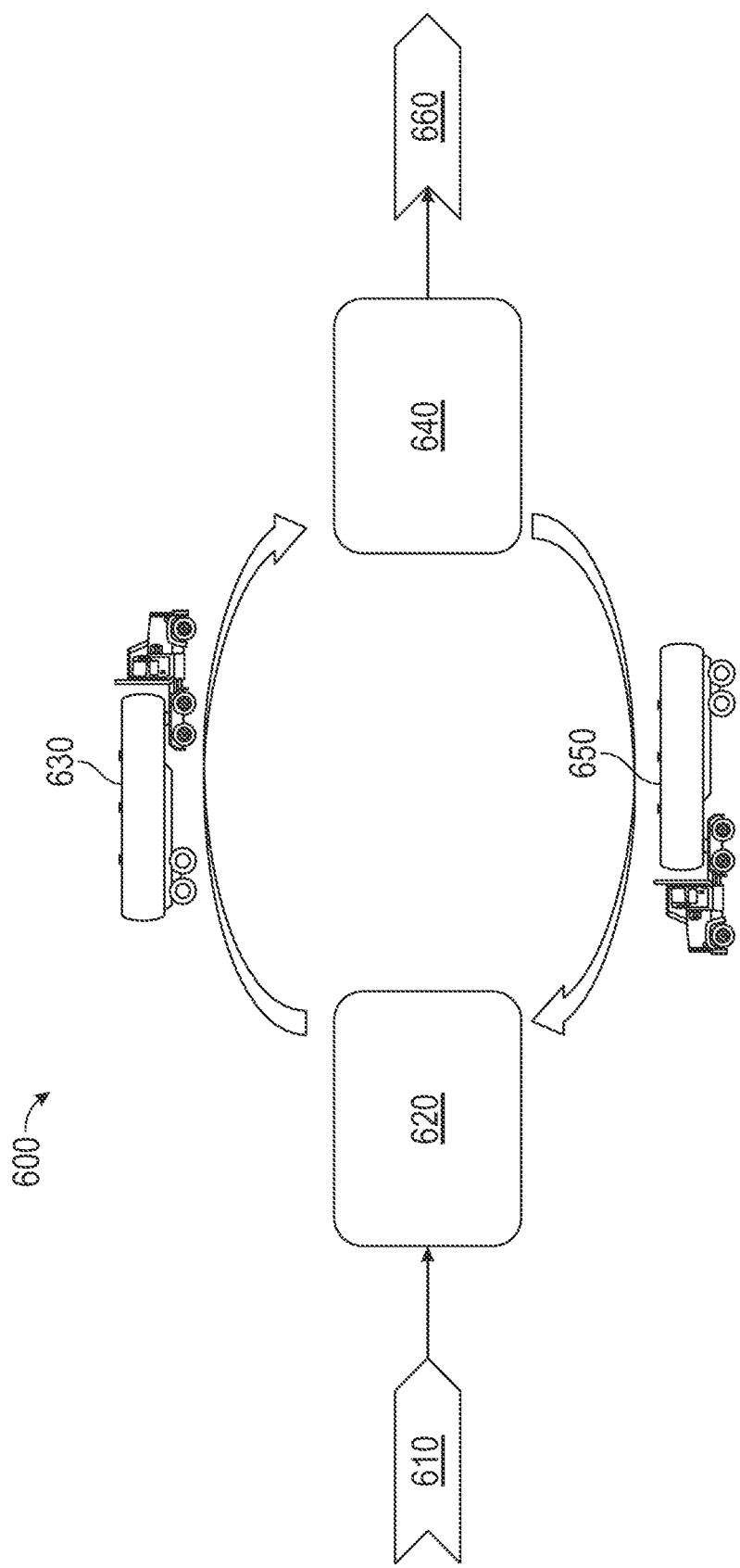
FIG. 7 is a schematic biocrude oil production process, according to one example.

FIG. 7 is a schematic diagram of a biocrude oil production process 600, according to one example. The biocrude oil production process 600 comprises a waste material feed source 610, a HTL plant 620 disposed downstream of the waste material feed source 610, a refinery 640 disposed downstream of the HTL plant 620, and a finished fuels storage 660 disposed downstream of the refinery 640.

In the biocrude oil production process 600, the waste material feed source 610 (which is also referred to herein as a "biomass source" and/or a "biomass feed source") can be configured to supply biological waste materials (e.g., biomass) to the HTL plant 620. The HTL plant 620 can comprise a HTL reactor system configured to produce an emulsion from the biomass provided by the waste material feed source 610 and an HTL solvent extraction system configured to separate or extract biocrude oil from the emulsion using a solvent. The HTL reactor system and the HTL solvent extraction system can be configured according to any of the examples described herein.

The HTL plant 620 can be configured to provide the biocrude oil to the refinery 640. In some examples, the biocrude oil can be transported to the refinery 640. Although the illustrated process 600 depicts the biocrude oil being transported in trucks 630, the biocrude oil can be transported to the refinery 640 using any mode of transportation (e.g., ships, pipelines, etc.). In some examples, the biocrude oil transported to the refinery 640 from the HTL plant 620 can include a selected amount of solvent to, for example, reduce the viscosity and improve pumpability of the biocrude oil.

The refinery 640 can be configured to receive and process the biocrude oil into naphtha and other finished fuels (e.g., diesel fuel, jet fuel (e.g., kerosene), gasoline, etc.). The refinery 640 can comprise a fractional distillation tower, and a solvent production system comprising a naphtha reformer as described above with reference to FIG. 6. The fractional distillation tower can be configured to refine biocrude oil into finished fuels, while the solvent production system can be configured to produce solvent from naphtha produced by the naphtha reformer. The refinery 640 can be configured to provide the finished fuels to the finished fuels storage 660.

The refinery 640 can be configured to produce the solvent used by the HTL solvent extraction system of the HTL plant 620. In some examples, the fractional distillation tower can be configured to separate and recover the solvent from the finished fuels (e.g., during distillation of the biocrude oil). In some examples, the solvent production system can be configured to produce the solvent used by the solvent extraction system of the HTL plant 620. The refinery 640 can provide the solvent recovered by the fractional distillation tower and/or produced by the solvent production system to the HTL plant 620, for example, by shipping the solvent to the HTL plant 620 in trucks 650. However, it should be understood that solvent can be transported to the HTL plant 620 using any mode of transportation (e.g., ships, pipelines, etc.).

In the illustrated process 600, the exchange of biocrude oil and solvent between the HTL plant 620 and the refinery 640 can beneficially create an at least partially closed loop in which biocrude oil can be sent to the refinery and any solvent remaining in the biocrude oil can be recovered and reused by the HTL plant 620. This mutually beneficial relationship between the HTL plant 620 and the refinery 640 can further reduce solvent loss throughout the biocrude oil production process 600. Additionally, the solvent does not need to be highly purified, and can include relatively low-cost, octane-boosting molecules such as toluene, xylene, benzene, and other aromatic molecules that are produced in abundance at many refineries for gasoline blending and do not require special feedstocks or specialized production equipment.

In some examples, the trucks 630 configured to deliver the biocrude oil can also be configured to deliver the solvent or, conversely, the trucks 650 configured to deliver the solvent can also be configured to deliver the biocrude oil. In such examples, using the same transportation infrastructure (e.g., trucks, ships, pipelines) to deliver the biocrude oil to the refinery 640 and the solvent to the HTL plant 620 can further reduce the cost of transporting the biocrude oil and/or solvent and can further streamline the biocrude oil production process 600.

Example 7: Representative HTL Solvent Extraction Process

Figure 8:
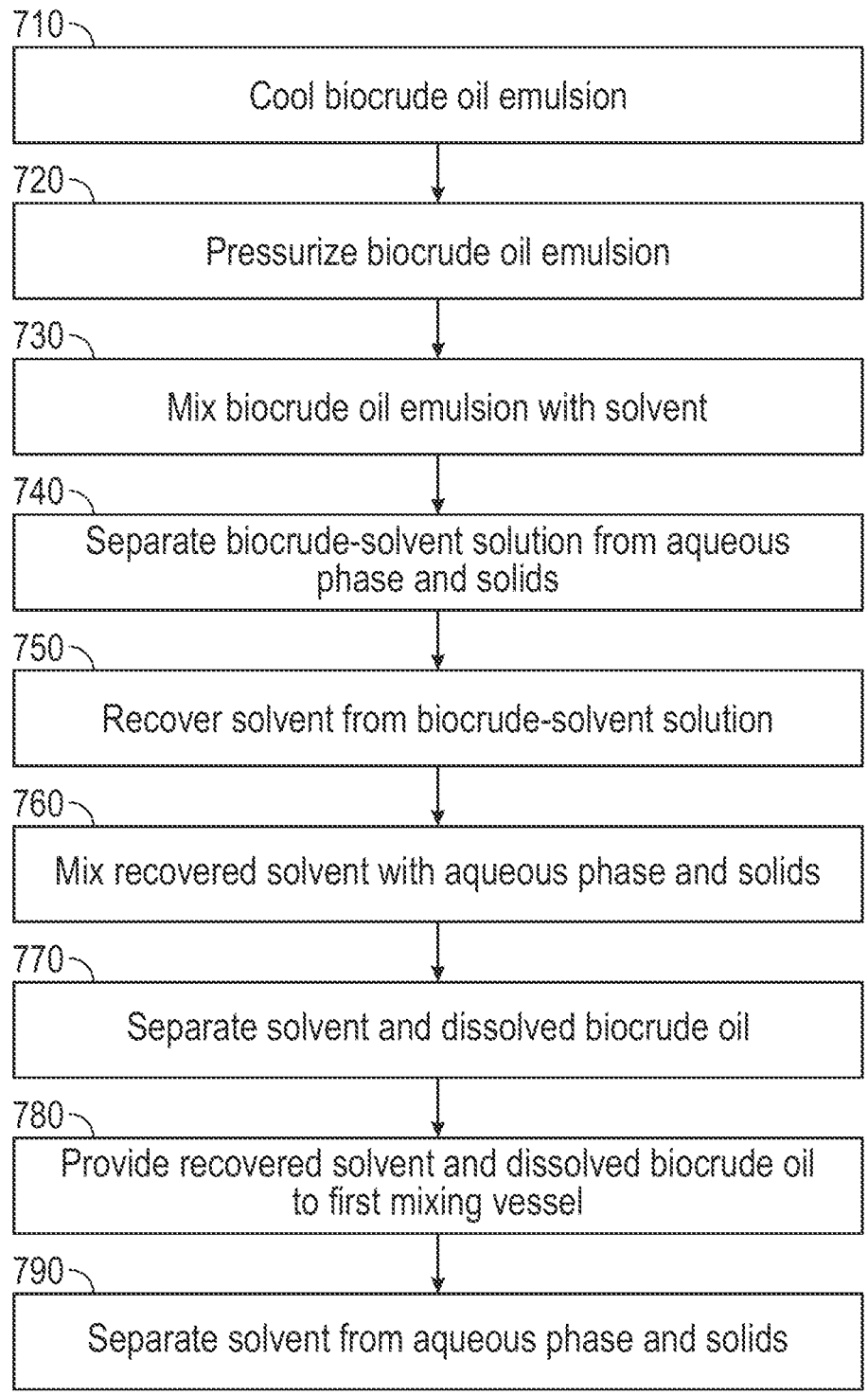
FIG. 8 is a flow chart of a HTL solvent extraction process, according to one example.

FIG. 8 is a flow chart of a HTL solvent extraction process 700, according to one example. The process 700 depicted by FIG. 8 can be performed by any of the HTL solvent extraction systems disclosed herein.

The process 700 can comprise a first step 710 of cooling a biocrude oil emulsion stream received from a biocrude oil emulsion source. The biocrude oil emulsion stream can comprise an emulsion including a biocrude oil phase, an aqueous phase, and solids. The first step 710 can be performed by a first heat exchanger. In some examples, the biocrude oil emulsion stream can be cooled to a temperature from 20° C. to 100° C., such as from 40° C. to 80° C. and/or from 20° C. to 65° C.

The process 700 can comprise an optional second step 720 of pressurizing the emulsion before the emulsion enters the first mixing vessel. The second step 70 can be performed by a pump.

The process 700 can comprise a third step 730 of mixing the emulsion with a solvent to dissolve the biocrude oil phase and form a biocrude-solvent solution. The third step 730 can be performed by a first mixing vessel.

The process 700 can comprise a fourth step 740 of separating the biocrude-solvent solution from the aqueous phase and the solids. The fourth step 740 can be performed by a first separator assembly.

The process 700 can comprise a fifth step 750 of recovering solvent from the biocrude-solvent solution received from the first separator assembly. The fifth step 750 can be performed by a solvent recovery apparatus. In some examples, the biocrude-solvent solution can be circulated through the first heat exchanger to cool the biocrude oil emulsion stream.

The process 700 can comprise a sixth step 760 of mixing the recovered solvent with the aqueous phase and the solids received from the first separator assembly to dissolve biocrude oil remaining in the aqueous phase and the solids. The sixth step 760 can be performed by a second mixing vessel.

The process can comprise an optional seventh step 770 of separating the recovered solvent and dissolved biocrude oil received from the second mixing vessel from aqueous phase and solids received from the second mixing vessel. The seventh step 770 can be performed by a second separator assembly.

The process can comprise an eighth step 780 of providing the recovered solvent and dissolved biocrude oil to the first mixing vessel as the solvent.

The process can comprise an optional ninth step 790 of separating solvent from aqueous phase and solids received from the second mixing vessel and/or the second separator assembly.

In some examples, the ninth step 790 can comprise first, second, third, and fourth sub-steps. The first and third sub-steps can be performed by a second heat exchanger, and the second sub-step can be performed by a water product stripper apparatus. The first sub-step can comprise heating aqueous phase and solids received from the second mixing vessel and/or the second separator assembly. The second sub-step can comprise separating entrained solvent from the aqueous phase and solids. The optional third sub-step can comprise circulating aqueous phase and solids received from the water product stripper apparatus to heat the aqueous phase and the solids received from the second mixing vessel and/or the second separator assembly. The fourth sub-step can comprise supplying solvent received from the water product stripper apparatus to the second mixing vessel as a portion of the recovered solvent provided to the first mixing vessel.

Additional Examples of the Disclosed Technology

In view of the above-described implementations of the disclosed subject matter, this application discloses the additional examples enumerated below. It should be noted that one feature of an example in isolation or more than one feature of the example taken in combination and, optionally, in combination with one or more features of one or more further examples are further examples also falling within the disclosure of this application.

Example 1. A method can comprise:
in a heat exchanger, cooling a biocrude oil emulsion stream received from a biocrude oil emulsion source, wherein the biocrude oil emulsion stream can comprise an emulsion including a biocrude oil phase, an aqueous phase, and solids;
in a first mixing vessel, mixing the emulsion with a solvent to dissolve the biocrude oil phase and form a biocrude-solvent solution;
in a first separator assembly, separating the biocrude-solvent solution from the aqueous phase and the solids;
in a solvent recovery apparatus, recovering solvent from the biocrude-solvent solution;
in a second mixing vessel, mixing the recovered solvent with the aqueous phase and the solids received from the first separator assembly to dissolve biocrude oil remaining in the aqueous phase and the solids; and
providing the recovered solvent and dissolved biocrude oil to the first mixing vessel as the solvent.

Example 2. The method of any example herein, particularly example 1, wherein the biocrude oil emulsion stream can be cooled in the heat exchanger to a temperature from 20° C. to 100° C.

Example 3. The method of any example herein, particularly any one of examples 1-2, wherein the biocrude oil emulsion stream can be cooled in the heat exchanger to a temperature from 40° C. to 80° C.

Example 4. The method of any example herein, particularly any one of examples 1-3, which can further comprise:
in a pump, pressurizing the emulsion before the emulsion enters the first mixing vessel.

Example 5. The method of any example herein, particularly any one of examples 1-4, which can further comprise:
in a second heat exchanger, heating aqueous phase and solids received from the second mixing vessel; and
in a water product stripper apparatus, separating solvent from aqueous phase and solids received from the second heat exchanger.

Example 6. The method of any example herein, particularly example 5, which can further comprise:
 in the second heat exchanger, circulating aqueous phase and solids received from the water product stripper apparatus to heat the aqueous phase and the solids received from the second mixing vessel.

Example 7. The method of any example herein, particularly example 5, which can further comprise:
 supplying solvent received from the water product stripper apparatus to the second mixing vessel as a portion of the recovered solvent provided to the first mixing vessel.

Example 8. The method of any example herein, particularly any one of examples 1-7, which can further comprise:
 circulating biocrude-solvent solution received from the first separator assembly through the heat exchanger to cool the biocrude oil emulsion stream.

Example 9. The method of any example herein, particularly any one of examples 1-7, which can further comprise:
 in a second separator assembly, separating the solvent and dissolved biocrude oil received from the second mixing vessel from aqueous phase and solids received from the second mixing vessel.

Example 10. A system can comprise:
 a biocrude oil emulsion source;
 a heat exchanger disposed downstream of the biocrude oil emulsion source, wherein the heat exchanger can be configured to cool a biocrude oil emulsion stream received from the biocrude oil emulsion source, and wherein the biocrude oil emulsion stream can comprise an emulsion including a biocrude oil phase, an aqueous phase, and solids;
 a first mixing vessel disposed downstream of the heat exchanger, wherein the first mixing vessel can be configured to mix the emulsion with a solvent to dissolve the biocrude oil phase in the emulsion and form a biocrude-solvent solution;
 a first separator assembly disposed downstream of the first mixing vessel, wherein the first separator assembly can be configured to separate the biocrude-solvent solution from the aqueous phase and the solids;
 a solvent recovery apparatus disposed downstream of the first separator assembly, wherein the solvent recovery apparatus can be configured to separate biocrude oil and solvent from the biocrude-solvent solution;
 a second mixing vessel disposed downstream of the first separator assembly and disposed downstream of the solvent recovery apparatus, wherein the second mixing vessel can be configured to mix solvent received from the solvent recovery apparatus with aqueous phase and solids received from the first separator assembly to dissolve biocrude oil remaining in the aqueous phase and the solids; and
 a second separator assembly disposed downstream of the second mixing vessel, wherein the second separator assembly can be configured to separate solvent and biocrude oil from the aqueous phase and solids received from the second mixing vessel and supply the solvent and biocrude oil to the first mixing vessel as the solvent.

Example 11. The system of any example herein, particularly claim 10, wherein the solvent recovery apparatus can comprise a fractional distillation column.

Example 12. The system of any example herein, particularly any one of examples 10-11, which can further comprise a steam source configured to heat the solvent recovery apparatus.

Example 13. The system of any example herein, particularly any one of examples 10-12, which can further comprise a first condenser disposed downstream of the solvent recovery apparatus, wherein the first condenser can be configured to condense solvent received from the solvent recovery apparatus.

Example 14. The system of any example herein, particularly example 13, which can further comprise a second condenser disposed downstream of the first condenser, wherein the second condenser can be configured to condense light hydrocarbons received from the first condenser.

Example 15. The system of any example herein, particularly example 14, wherein the light hydrocarbons can be introduced into a biocrude oil stream provided by the solvent recovery apparatus.

Example 16. The system of any example herein, particularly any one of examples 10-15, which can further comprise a de-oiling cyclone disposed downstream of the second separator assembly, wherein the de-oiling cyclone can be configured to separate solvent from aqueous phase and solids received from the second separator assembly.

Example 17. The system of any example herein, particularly example 16, wherein the de-oiling cyclone can be configured to provide the solvent to the second mixing vessel.

Example 18. The system of any example herein, particularly any one of examples 16-17, wherein the de-oiling cyclone can be configured to introduce the separated solvent into an aqueous-solids stream disposed upstream of the de-oiling cyclone and downstream of the second separator assembly.

Example 19. The system of any example herein, particularly any one of examples 10-18, which can further comprise a water product stripper apparatus disposed downstream of the second separator assembly, wherein the water product stripper apparatus can be configured to recover solvent from aqueous phase and solids received from the second separator assembly.

Example 20. A system can comprise:
 a hydrothermal liquefaction (HTL) reactor system configured to produce an emulsion comprising biocrude oil and an aqueous phase; and
 a HTL solvent extraction system disposed downstream of the HTL reactor system comprising:
  a mixing vessel disposed downstream of the HTL reactor system, wherein the mixing vessel is configured to mix the emulsion with a solvent;
  a separator assembly disposed downstream of the mixing vessel, wherein the separator assembly is configured to receive the emulsion mixed with the solvent and separate the biocrude oil and the solvent from the aqueous phase; and
  a solvent recovery apparatus disposed downstream of the separator assembly, wherein the solvent recovery apparatus is configured to separate the biocrude oil from the solvent.

Additional Considerations

Similar reference numbers can refer to components with similar features. For example, certain examples of HTL solvent extraction systems 130, 230, 330, and 430 can share certain similar features. Furthermore, certain examples of separator assemblies 150, 250, 280, 350, 380, 450, 480, etc. can share certain similar features. Additionally, certain examples of solvent recovery apparatuses 160, 260, 360, etc. can share certain similar features. Finally, certain examples of water product stripper apparatuses 290, 390, etc. can share certain similar features. However, it should be understood that these examples are not exhaustive, and any other components disclosed in this application that share reference numbers (e.g., references numbers incremented by hundreds) can potentially share certain similar features. Additionally, it should be understood that components of the various systems described herein including the systems of FIGS. 1-6 can be combined in various ways.

In view of the many possible embodiments to which the principles of the disclosed technology may be applied, it should be recognized that the illustrated embodiments are only preferred examples and should not be taken as limiting the scope of the disclosure. Rather, the scope of the disclosure is at least as broad as the following claims and equivalents of the recited features. We therefore claim all that comes within the scope and spirit of these claims.

We claim:

1. A method comprising:
    in a heat exchanger, cooling a biocrude oil emulsion stream received from a biocrude oil emulsion source, the biocrude oil emulsion stream comprising an emulsion including a biocrude oil phase, an aqueous phase, and solids;
    in a first mixing vessel, mixing the emulsion with a solvent to dissolve the biocrude oil phase and form a biocrude-solvent solution;
    in a first separator assembly, separating the biocrude-solvent solution from the aqueous phase and the solids;
    in a solvent recovery apparatus, recovering solvent from the biocrude-solvent solution;
    in a second mixing vessel, mixing the recovered solvent with the aqueous phase and the solids received from the first separator assembly to dissolve biocrude oil remaining in the aqueous phase and the solids; and
    providing the recovered solvent and dissolved biocrude oil to the first mixing vessel as the solvent.

2. The method of claim 1, wherein the biocrude oil emulsion stream is cooled in the heat exchanger to a temperature from 20° C. to 100° C.

3. The method of claim 1, wherein the biocrude oil emulsion stream is cooled in the heat exchanger to a temperature from 40° C. to 80° C.

4. The method of claim 1, further comprising:
    in a pump, pressurizing the emulsion before the emulsion enters the first mixing vessel.

5. The method of claim 1, further comprising:
    in a second heat exchanger, heating aqueous phase and solids received from the second mixing vessel; and
    in a water product stripper apparatus, separating solvent from aqueous phase and solids received from the second heat exchanger.

6. The method of claim 5, further comprising:
    in the second heat exchanger, circulating aqueous phase and solids received from the water product stripper apparatus to heat the aqueous phase and the solids received from the second mixing vessel.

7. The method of claim 5, further comprising:
    supplying solvent received from the water product stripper apparatus to the second mixing vessel as a portion of the recovered solvent provided to the first mixing vessel.

8. The method of claim 1, further comprising:
    circulating biocrude-solvent solution received from the first separator assembly through the heat exchanger to cool the biocrude oil emulsion stream.

9. The method of claim 1, further comprising:
    in a second separator assembly, separating the solvent and dissolved biocrude oil received from the second mixing vessel from aqueous phase and solids received from the second mixing vessel.

10. A system comprising:
    a biocrude oil emulsion source;
    a heat exchanger disposed downstream of the biocrude oil emulsion source, wherein the heat exchanger is configured to cool a biocrude oil emulsion stream received from the biocrude oil emulsion source, and wherein the biocrude oil emulsion stream comprises an emulsion including a biocrude oil phase, an aqueous phase, and solids;
    a first mixing vessel disposed downstream of the heat exchanger, wherein the first mixing vessel is configured to mix the emulsion with a solvent to dissolve the biocrude oil phase in the emulsion and form a biocrude-solvent solution;
    a first separator assembly disposed downstream of the first mixing vessel, wherein the first separator assembly is configured to separate the biocrude-solvent solution from the aqueous phase and the solids;
    a solvent recovery apparatus disposed downstream of the first separator assembly, wherein the solvent recovery apparatus is configured to separate biocrude oil and solvent from the biocrude-solvent solution;
    a second mixing vessel disposed downstream of the first separator assembly and disposed downstream of the solvent recovery apparatus, wherein the second mixing vessel is configured to mix solvent received from the solvent recovery apparatus with aqueous phase and solids received from the first separator assembly to dissolve biocrude oil remaining in the aqueous phase and the solids; and
    a second separator assembly disposed downstream of the second mixing vessel, wherein the second separator assembly is configured to separate solvent and biocrude oil from the aqueous phase and solids received from the second mixing vessel and supply the solvent and biocrude oil to the first mixing vessel as the solvent.

11. The system of claim 10, wherein the solvent recovery apparatus comprises a fractional distillation column.

12. The system of claim 10, further comprising a steam source configured to heat the solvent recovery apparatus.

13. The system of claim 10, further comprising a first condenser disposed downstream of the solvent recovery apparatus, wherein the first condenser is configured to condense solvent received from the solvent recovery apparatus.

14. The system of claim 13, further comprising a second condenser disposed downstream of the first condenser, wherein the second condenser is configured to condense light hydrocarbons received from the first condenser.

15. The system of claim 14, wherein the light hydrocarbons are introduced into a biocrude oil stream provided by the solvent recovery apparatus.

16. The system of claim 15, further comprising a de-oiling cyclone disposed downstream of the second separator assembly, wherein the de-oiling cyclone is configured to separate solvent from aqueous phase and solids received from the second separator assembly.

17. The system of claim 16, wherein the de-oiling cyclone is configured to provide the solvent to the second mixing vessel.

18. The system of claim 16, wherein the de-oiling cyclone is configured to introduce the separated solvent into an aqueous-solids stream disposed upstream of the de-oiling cyclone and downstream of the second separator assembly.

19. The system of claim 10, further comprising a water product stripper apparatus disposed downstream of the second separator assembly, wherein the water product stripper apparatus is configured to recover solvent from aqueous phase and solids received from the second separator assembly.

20. A system comprising:
- a hydrothermal liquefaction (HTL) reactor system configured to produce an emulsion comprising biocrude oil and an aqueous phase; and
- a HTL solvent extraction system disposed downstream of the HTL reactor system comprising:
  - a first mixing vessel disposed downstream of the HTL reactor system, wherein the first mixing vessel is configured to mix the emulsion with a solvent;
  - a first separator assembly disposed downstream of the first mixing vessel, wherein the first separator assembly is configured to receive the emulsion mixed with the solvent and separate the biocrude oil and the solvent from the aqueous phase;
  - a solvent recovery apparatus disposed downstream of the first separator assembly, wherein the solvent recovery apparatus is configured to receive biocrude oil and solvent from the first separator assembly and separate the biocrude oil from the solvent;
  - a second mixing vessel disposed downstream of the first separator assembly and the solvent recovery apparatus, wherein the second mixing vessel is configured to mix solvent received from the solvent recovery apparatus with aqueous phase received from the first separator assembly to dissolve biocrude oil remaining in the aqueous phase; and
  - a second separator assembly disposed downstream of the second mixing vessel, wherein the second separator assembly is configured to separate solvent and biocrude oil from aqueous phase received from the second mixing vessel and supply the solvent and the biocrude oil to the first mixing vessel as the solvent.

\* \* \* \* \*